(12) United States Patent
Farhan et al.

(10) Patent No.: US 10,908,940 B1
(45) Date of Patent: Feb. 2, 2021

(54) DYNAMICALLY MANAGED VIRTUAL SERVER SYSTEM

(71) Applicant: Amazon Technologies, Inc., Seattle, WA (US)

(72) Inventors: Munif M. Farhan, Clyde Hill, WA (US); Ahmed Mohammed Shihab, Seattle, WA (US); Darin Lee Frink, Lake Tapps, WA (US)

(73) Assignee: Amazon Technologies, Inc., Seattle, WA (US)

(*) Notice: Subject to any disclaimer, the term of this patent is extended or adjusted under 35 U.S.C. 154(b) by 179 days.

(21) Appl. No.: 15/905,684

(22) Filed: Feb. 26, 2018

(51) Int. Cl.
| G06F 9/455 | (2018.01) |
| H04L 29/08 | (2006.01) |
| H04L 12/24 | (2006.01) |

(52) U.S. Cl.
CPC .......... G06F 9/45558 (2013.01); H04L 41/12 (2013.01); H04L 67/10 (2013.01); *G06F 2009/4557* (2013.01); *G06F 2009/45583* (2013.01); *G06F 2009/45595* (2013.01)

(58) Field of Classification Search
CPC .................................................. G06F 9/45533
USPC ............................................................. 718/1
See application file for complete search history.

(56) References Cited

U.S. PATENT DOCUMENTS

| 5,867,372 | A | 2/1999 | Shie |
| 5,918,432 | A | 7/1999 | Mahone et al. |
| 6,110,214 | A | 8/2000 | Klimasauskas |
| 6,269,382 | B1 | 7/2001 | Cabrera et al. |
| 6,330,572 | B1 | 12/2001 | Sitka |
| 7,007,048 | B1 | 2/2006 | Murray et al. |
| 7,103,740 | B1 | 9/2006 | Colgrove et al. |
| 7,225,211 | B1 | 5/2007 | Colgrove et al. |
| 7,293,133 | B1 | 11/2007 | Colgrove et al. |
| 7,734,661 | B2 | 6/2010 | Jordan et al. |
| 7,756,989 | B2 | 7/2010 | Goldszmidt et al. |
| 7,757,214 | B1 | 7/2010 | Palczak et al. |

(Continued)

FOREIGN PATENT DOCUMENTS

| JP | 2006031668 | 2/2006 |
| JP | 2011515727 | 5/2011 |
| WO | 2014100558 | 6/2014 |

OTHER PUBLICATIONS

Kohl, John, Carl Staelin, and Michael Stonebraker. "HighLight: using a log-structured file system for tertiary storage management." Proceedings of the 1993 Winter USENIX Meeting. 1992. pp. 1-15.

(Continued)

*Primary Examiner* — Mehran Kamran
(74) *Attorney, Agent, or Firm* — Robert C. Kowert; Kowert, Hood, Munyon, Rankin & Goetzel, P.C.

(57) ABSTRACT

A virtual server system includes multiple pools of server components connected via a high-speed communication fabric and a dynamic virtual server manager configured to determine attributes of a workload in multiple workload dimensions and configure a virtual server using server components of the server component pools. The selected server components implement a virtual server configured based on the determine workload attributes in the multiple workload dimensions. Also, the dynamic virtual server manager dynamically adjusts which server components are used to implement the virtual server based on changes in workload attributes.

21 Claims, 13 Drawing Sheets

(56) References Cited

U.S. PATENT DOCUMENTS

| | | | |
|---|---|---|---|
| 7,949,637 B1 | 5/2011 | Burke | |
| 7,953,891 B2 | 5/2011 | Blaszczak et al. | |
| 8,024,369 B2 | 9/2011 | Pellegrini et al. | |
| 8,055,622 B1 | 11/2011 | Botes et al. | |
| 8,095,486 B2 | 1/2012 | Chen et al. | |
| 8,127,095 B1 | 2/2012 | Colgrove et al. | |
| 8,154,870 B1 | 4/2012 | Czamara et al. | |
| 8,180,495 B1 | 5/2012 | Roy | |
| 8,327,589 B2 | 12/2012 | Sutton et al. | |
| 8,370,597 B1 | 2/2013 | Chatterjee et al. | |
| 8,380,657 B2 | 2/2013 | Shaik et al. | |
| 8,477,491 B1 | 7/2013 | Ross et al. | |
| 8,582,299 B1 | 11/2013 | Phillips et al. | |
| 8,627,035 B2 | 1/2014 | Ambat et al. | |
| 8,684,067 B1 | 4/2014 | Frame | |
| 9,014,155 B2 | 4/2015 | Gupta et al. | |
| 9,069,622 B2 | 6/2015 | Post et al. | |
| 9,098,323 B2 | 8/2015 | Mitra et al. | |
| 9,198,310 B2 | 11/2015 | Eichelberg et al. | |
| 9,215,142 B1 | 12/2015 | Herold et al. | |
| 9,256,381 B1 | 2/2016 | Fultz et al. | |
| 9,356,883 B1 | 5/2016 | Borthakur | |
| 9,379,995 B2 | 6/2016 | Shankari et al. | |
| 9,406,023 B2 | 8/2016 | Bogojeska et al. | |
| 9,605,459 B2 | 3/2017 | Veino et al. | |
| 9,712,535 B1 | 7/2017 | Rossman | |
| 9,928,097 B1* | 3/2018 | Krottapalli | G06F 16/2228 |
| 10,176,550 B1* | 1/2019 | Baggerman | G06T 1/20 |
| 2003/0125023 A1 | 7/2003 | Fishler | |
| 2004/0117624 A1 | 6/2004 | Brandt et al. | |
| 2004/0199566 A1 | 10/2004 | Carlson et al. | |
| 2005/0050185 A1 | 3/2005 | King et al. | |
| 2005/0071349 A1 | 3/2005 | Jordan et al. | |
| 2006/0112073 A1 | 5/2006 | Jensen et al. | |
| 2007/0025095 A1 | 2/2007 | Beall et al. | |
| 2007/0033156 A1 | 2/2007 | Limpert et al. | |
| 2007/0240161 A1 | 10/2007 | Prabhakar et al. | |
| 2007/0271302 A1 | 11/2007 | Atkins et al. | |
| 2008/0080261 A1 | 4/2008 | Shaeffer et al. | |
| 2008/0098375 A1 | 4/2008 | Isard | |
| 2008/0172672 A1* | 7/2008 | Logan | G06F 9/45533 718/104 |
| 2009/0167739 A1 | 7/2009 | Tsubata | |
| 2009/0177671 A1 | 7/2009 | Pellegrini et al. | |
| 2009/0192979 A1 | 7/2009 | Lunde | |
| 2009/0263992 A1 | 10/2009 | Dittus et al. | |
| 2010/0049637 A1 | 2/2010 | Laventman et al. | |
| 2010/0110925 A1 | 5/2010 | Wu | |
| 2010/0115510 A1* | 5/2010 | Ford | G06F 9/5077 718/1 |
| 2010/0257140 A1 | 10/2010 | Davis et al. | |
| 2010/0263830 A1 | 10/2010 | Noteboom et al. | |
| 2010/0274750 A1 | 10/2010 | Oltean et al. | |
| 2010/0289392 A1 | 11/2010 | DeWeerd | |
| 2010/0300999 A1 | 12/2010 | Schwartzkopf et al. | |
| 2010/0313203 A1 | 12/2010 | Dawson et al. | |
| 2011/0083131 A1 | 4/2011 | Pirzada et al. | |
| 2011/0108207 A1 | 5/2011 | Mainers et al. | |
| 2011/0134111 A1 | 6/2011 | Stone | |
| 2011/0145392 A1 | 6/2011 | Dawson et al. | |
| 2011/0161712 A1 | 6/2011 | Athalye et al. | |
| 2011/0182422 A1 | 7/2011 | Anderson et al. | |
| 2011/0189936 A1 | 8/2011 | Haspers et al. | |
| 2011/0271610 A1 | 11/2011 | Cottuli et al. | |
| 2011/0291852 A1 | 12/2011 | Forristal et al. | |
| 2012/0005424 A1 | 1/2012 | Shi et al. | |
| 2012/0069032 A1 | 3/2012 | Hansson et al. | |
| 2012/0072656 A1 | 3/2012 | Archak et al. | |
| 2012/0104919 A1 | 5/2012 | Wu | |
| 2012/0154389 A1 | 6/2012 | Bohan et al. | |
| 2012/0166749 A1 | 6/2012 | Eleftheriou et al. | |
| 2012/0192201 A1* | 7/2012 | Sander | G06T 1/20 718/105 |
| 2012/0240073 A1 | 9/2012 | McCann | |
| 2013/0007272 A1 | 1/2013 | Breitgand et al. | |
| 2013/0120931 A1 | 5/2013 | Sankar et al. | |
| 2013/0191527 A1* | 7/2013 | Ashok | H04L 67/1031 709/224 |
| 2014/0007093 A1 | 1/2014 | Deshpande et al. | |
| 2014/0019407 A1 | 1/2014 | Wong | |
| 2014/0055466 A1 | 2/2014 | Petrov et al. | |
| 2014/0084763 A1 | 3/2014 | Doglio et al. | |
| 2014/0092906 A1* | 4/2014 | Kandaswamy | H04L 45/38 370/392 |
| 2014/0108937 A1* | 4/2014 | Datla | G06F 11/3006 715/735 |
| 2014/0120824 A1 | 5/2014 | Lin | |
| 2014/0149591 A1 | 5/2014 | Bhattacharya et al. | |
| 2014/0169471 A1 | 6/2014 | He | |
| 2014/0176583 A1* | 6/2014 | Abiezzi | G06T 1/20 345/522 |
| 2014/0181297 A1 | 6/2014 | Nakatsugawa | |
| 2014/0181806 A1 | 6/2014 | Abiezzi et al. | |
| 2014/0188870 A1 | 7/2014 | Borthakur et al. | |
| 2014/0207928 A1* | 7/2014 | Mesnier | H04L 41/507 709/223 |
| 2014/0215462 A1 | 7/2014 | Kuo et al. | |
| 2014/0229607 A1 | 8/2014 | Jung et al. | |
| 2014/0280961 A1 | 9/2014 | Martinez et al. | |
| 2014/0286390 A1 | 9/2014 | Fear | |
| 2014/0298734 A1 | 10/2014 | Rogers | |
| 2014/0373010 A1* | 12/2014 | Folco | G06F 9/45533 718/1 |
| 2015/0047268 A1 | 2/2015 | Pensi | |
| 2015/0052275 A1 | 2/2015 | Maroney et al. | |
| 2015/0067223 A1 | 3/2015 | Xiao et al. | |
| 2015/0067672 A1 | 3/2015 | Mitra et al. | |
| 2015/0077922 A1 | 3/2015 | Herman et al. | |
| 2015/0077924 A1 | 3/2015 | Rauline | |
| 2015/0097844 A1 | 4/2015 | Wankhede et al. | |
| 2015/0100542 A1 | 4/2015 | Li et al. | |
| 2015/0113009 A1 | 4/2015 | Zhou et al. | |
| 2015/0116335 A1 | 4/2015 | Chen et al. | |
| 2015/0123562 A1 | 5/2015 | Adriaenssens et al. | |
| 2015/0149611 A1* | 5/2015 | Lissack | H04L 43/0817 709/224 |
| 2015/0187069 A1 | 7/2015 | Simanovsky et al. | |
| 2015/0208554 A1 | 7/2015 | Leigh et al. | |
| 2015/0220354 A1 | 8/2015 | Nair | |
| 2015/0221063 A1 | 8/2015 | Kim et al. | |
| 2015/0259938 A1 | 9/2015 | Bernard | |
| 2015/0286701 A1 | 10/2015 | Wideman | |
| 2015/0317606 A1 | 11/2015 | Bubna et al. | |
| 2015/0327381 A1 | 11/2015 | Alshinnawi et al. | |
| 2015/0347541 A1 | 12/2015 | Holmes et al. | |
| 2015/0370589 A1 | 12/2015 | Bidarkar et al. | |
| 2015/0370620 A1 | 12/2015 | Lai et al. | |
| 2016/0011900 A1* | 1/2016 | Reddy | H04L 67/38 718/1 |
| 2016/0013992 A1* | 1/2016 | Reddy | H04L 67/38 709/224 |
| 2016/0014039 A1* | 1/2016 | Reddy | H04L 67/38 709/224 |
| 2016/0062936 A1 | 3/2016 | Brassac et al. | |
| 2016/0070599 A1* | 3/2016 | Kruglick | G06F 9/5027 718/1 |
| 2016/0077840 A1* | 3/2016 | Khatri | G06F 9/505 713/2 |
| 2016/0106007 A1 | 4/2016 | Embleton et al. | |
| 2016/0128226 A1 | 5/2016 | Stellick et al. | |
| 2016/0147697 A1 | 5/2016 | Arroyo et al. | |
| 2016/0234962 A1 | 8/2016 | Shinsato | |
| 2016/0239333 A1 | 8/2016 | Cowperthwaite et al. | |
| 2016/0247248 A1 | 8/2016 | Ha et al. | |
| 2016/0261711 A1 | 9/2016 | Blum et al. | |
| 2017/0004808 A1 | 1/2017 | Agashe et al. | |
| 2017/0127568 A1 | 5/2017 | Rimler et al. | |
| 2017/0235613 A1* | 8/2017 | Smola | G06F 9/5083 718/1 |
| 2017/0331759 A1* | 11/2017 | Li | H04L 47/70 |
| 2018/0006903 A1* | 1/2018 | Ganguli | H04L 41/5009 |
| 2018/0248949 A1* | 8/2018 | Siddappa | H04L 67/1012 |
| 2018/0373567 A1* | 12/2018 | Finlay | G06F 9/5016 |

(56) References Cited

U.S. PATENT DOCUMENTS

| | | | |
|---|---|---|---|
| 2019/0034237 A1* | 1/2019 | Siddappa | H04L 67/1012 |
| 2019/0212949 A1* | 7/2019 | Pletka | G06F 3/0604 |
| 2019/0235765 A1* | 8/2019 | Crawford | G06F 3/0607 |

OTHER PUBLICATIONS

Muller, Keith, and Joseph Pasquale. "A high performance multi-structured file system design." ACM SIGOPS Operating Systems Review. vol. 25. No. 5. ACM, 1991. pp. 1-12.
U.S. Appl. No. 11/371,263, filed Mar. 8, 2006, John David Cormie et al.
Extended European Search Report from PCT/US2014/035531, dated Oct. 13, 2016, Amazon Technologies, Inc., pp. 1-8.
Office Action from Canadian Application No. 2,910,211, dated Sep. 28, 2016, Amazon Technologies, Inc., pp. 1-3.
International Search Report and Written Opinion from PCT/US2014/035531, dated Sep. 22, 2014, pp. 1-10.
"Data Storage Scheme Supporting for Multidimensional Query", Keji Mao, et al., 2013, pp. 1-9.
Office Action from Japanese Application No. 2016-510813, dated Nov. 22, 2016 (English translation and Japanese version), pp. 1-10.
U.S. Appl. No. 15/905,684, filed Feb. 26, 2018, Munif M. Farhan.
U.S. Appl. No. 14/217,121, filed Mar. 17, 2014, David Edward Bryan.
U.S. Appl. No. 14/489,453, filed Sep. 17, 2014, Mark Bradley Davis.
U.S. Appl. No. 14/938,654, filed Nov. 11, 2015, Nicholas Patrick Wilt.
U.S. Appl. No. 14/938,457, filed Nov. 11, 2015, Nicholas Patrick Wilt.
U.S. Appl. No. 14/822,511, filed Aug. 10, 2015, Nicholas Patrick Wilt, et al.
U.S. Appl. No. 14/938,457, filed Nov. 11, 2015, Nicholas Patrick Wilt, et al.
U.S. Appl. No. 14/938,461, filed Nov. 11, 2015, Nicholas Patrick Wilt, et al.
U.S. Appl. No. 14/938,656, filed Nov. 11, 2015, Nicholas Patrick Wilt, et al.
U.S. Appl. No. 14/938,654, filed Nov. 11, 2015, Nicholas Patrick Wilt, et al.
U.S. Appl. No. 15/178,292, filed Jun. 9, 2016, Nicholas Patrick Wilt.
U.S. Appl. No. 15/177,262, filed Jun. 8, 2016, Nicholas Patrick Wilt.
Federico Silla. "The rCUDA technology: an inexpensive way to improve the performance of GPU-based clusters." Talk at Computer Engineering Laboratory, Delft University of Technology. Delft, Netherlands. Apr. 2015, pp. 1-47.
Nice, "DCV Administration Guide," Nice s.r.l, Asti, Italy, Jul. 2015, Source: https://www.nice-software.com/download/nice-dcv-2014#documentation, pp. 1-96.
U.S. Appl. No. 15/470,821, filed Mar. 27, 2017, Malcolm Featonby, et al.
U.S. Appl. No. 15/249,150, filed Aug. 26, 2016, Gianpaolo Ingegneri.
U.S. Appl. No. 15/249,150, filed Aug. 26, 2016, Ingegneri.
U.S. Appl. No. 15/374,509, filed Dec. 9, 2016, Featonby, et al.
U.S. Appl. No. 15/417,064, filed Jan. 26, 2017, Featonby, et al.
U.S. Appl. No. 15/439,751, filed Feb. 22, 2017, Surani, et al.
Jeff Weiss, et al., "NVIDIA Grid VCPU Deployment Guide for VMware Horizon 6.1", NVIDIA TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.
Installing VMware VGPU on vSphere 6.0, Martijin Smit, Mar. 7, 2015, pp. 1-10.
Lin Shi, et al., "vCUDA: GPU-Accelerated High-Performance Computing in Virtual Machines", IEEE Transaction on Computers, vol. 61, No. 6, Jun. 2012, pp. 804-816.
Matthew Danish, et al., "Virtual-CPU Scheduling in the Quest Operating System", 2011 17th IEEE Real-Time and Embedded Technology and Application Symposium, Apr. 11, 2011, pp. 169-179
Mark Panahi, et al., "A Framework for Real-Time Service-Oriented Architecture", 2009 IEEE Conference on Commerce and Enterprise Computing (CED '09), Jul. 20, 2009, pp. 460-467.
Marcos D. Assuncao, et al., "CloudAffinity: A Framework for Matching Servers to Cloudmates", 2012 IEEE Network Operations and Management Symposium (NOMS 2012), Apr. 16-20, 2012, pp. 213-220.
Shinpei Kato, et al., "Gdev: First-Class GPU Resource Management in the Operating System", Jun. 1, 2012, Retrieved from URL: https://www.usenix.org/system/files/conference/atc12/atc12-final1319.pdf, pp. 1-12.
U.S. Appl. No. 15/276,704, filed Sep. 26, 2016, Brock Robert Gardner, et al.
U.S. Appl. No. 13/792,962, filed Nov. 24, 2015, John William Eichelberg, et al.
U.S. Appl. No. 14/949,589, filed Nov. 23, 2015, John William Eichelberg, et al.
U.S. Appl. No. 14/311,178, filed Jun. 20, 2014, Matthew Thomas Phillips, et al.
U.S. Appl. No. 62/426,584, filed Nov. 27, 2016.
International Search Report and Written Opinion from PCT/US2017/063271, dated Jan. 25, 2018, Amazon Technologies, Inc., pp. 1-17.
Bratko, A. et al., "Exploiting Structural Information for semi-structured document categorization", Information Processing & Management, Dated May 1, 2006, vol. 42, No. 3, pp. 679-694.
Juan Trujillo et al., "A UML Based Approach for Modeling ETL Processes in data warehouses", In: Network and parallel computing, dated Oct. 16, 2003, pp. 1-14.
Anonymous, "Start informatica job when a row is updated", retrieved from URL: https://networkinformatica.com/thread/13920. on Jan. 10, 2018. pp. 1-5.
Anonymous, "File based job trigger for deploying talend open studio jobs—Talend Community forum", Retrieved from URL: https//www.talendforge.org/forum/viewtopic.php?id=45580, retrieved on Jan. 10, 2018, pp. 1-3.
Oracle: "Triggers-Oracle Database Concepts", Retrieved from URL: https://Web.archive.org/web/20150918220843/https://docs.oracle.com/cd/B19306_01/server.102/b14220/triggers.htm, retrieved on Jan. 11, 2018, pp. 1-17.
U.S. Appl. No. 15/385,764, filed Dec. 20, 2016, Mehul A. Shah et al.
U.S. Appl. No. 15/385,772, filed Dec. 20, 2016, Mehul A. Shah et al.
U.S. Appl. No. 15/385,784, filed Dec. 20, 2016, George Steven McPherson et al.
U.S. Appl. No. 15/385,789, filed Dec. 20, 2016, George Steven McPherson et al.
U.S. Appl. No. 15/385,777, filed Dec. 20, 2016, Mehul A. Shah et al.
U.S. Appl. No. 15/812,923, filed Nov. 14, 2017, Ankit Kamboj.

* cited by examiner

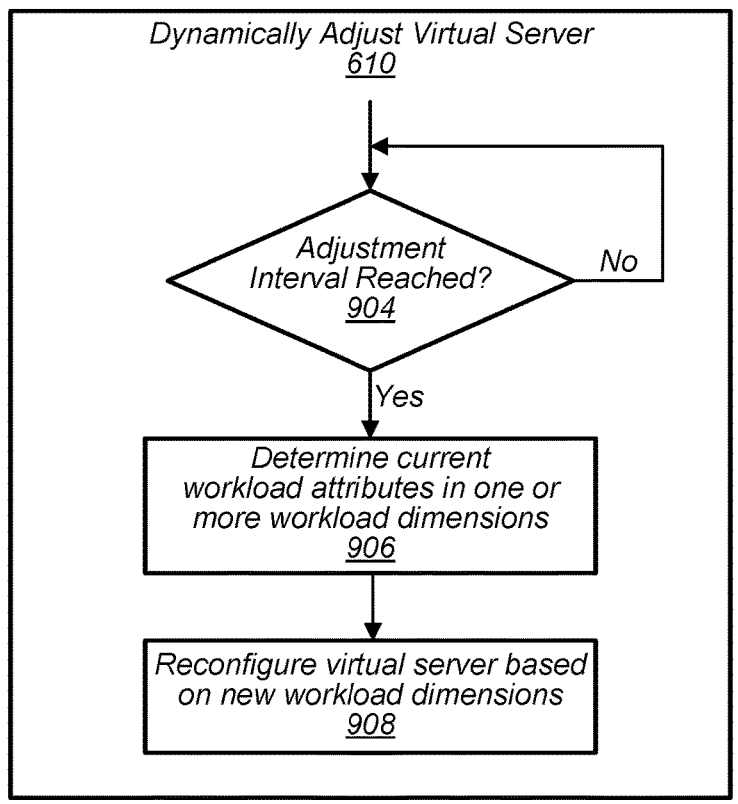
FIG.9A
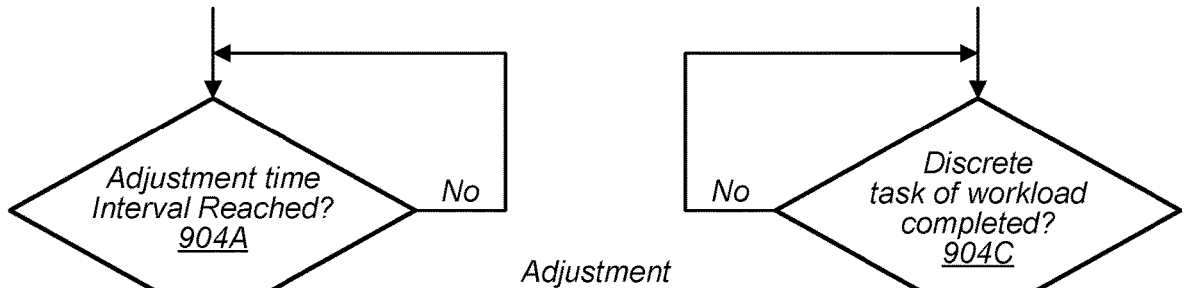
FIG.9B
FIG.9C
FIG.9D ized, but may also include some processors and some high computational load processing servers may include some data storage devices. However, due to the intended use of such servers, some components of the servers may be underutilized.

DYNAMICALLY MANAGED VIRTUAL SERVER SYSTEM

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations.

Often servers mounted in racks of such facilities include servers configured to perform various computing or storage tasks. For example, some servers may be configured to perform high-volume low-cost storage for infrequently accessed data, and other servers may be configured to store more frequently accessed data. Also, some servers may be configured to perform tasks that involve high computational loads, whereas other servers may be configured with lower-cost components and may be configured to perform less demanding computational loads.

Such servers may include additional components in addition to the components that perform the primary function of the servers. For example, low cost storage servers may also include some processors and some high computational load processing servers may include some data storage devices. However, due to the intended use of such servers, some components of the servers may be underutilized.

Also the fixed configurations of such servers may limit flexibility of the servers to adjust to changing workloads. For example, a server may include a fixed number of processors, hard disk drives, solid state drives, tape drives, etc.

BRIEF DESCRIPTION OF THE DRAWINGS

FIG. 9A further illustrates dynamically adjusting a virtual server configuration due to changes in workload attributes, according to some embodiments.

FIGS. 9B-9D illustrate example adjustment intervals that may trigger a reconfiguration of a virtual server, according to some embodiments.

Figure 1:
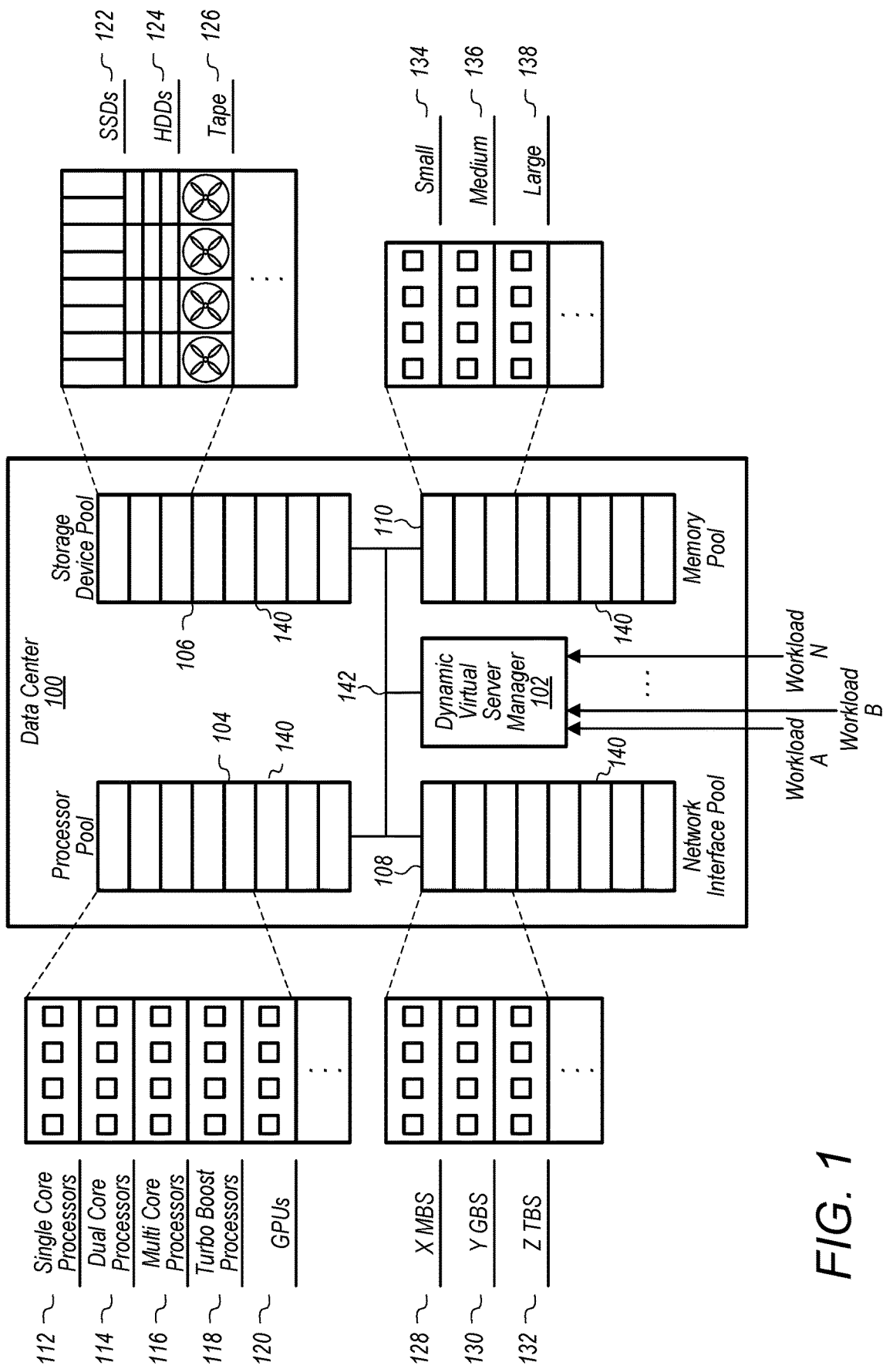
FIG. 1 illustrates a data center comprising multiple racks, wherein the racks include pools of different types of server components, the data center also includes a network fabric connecting the server components, and a dynamic virtual server manager, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of virtual servers, and systems and methods of implementing virtual servers are disclosed. According to some embodiments, a data center includes a rack comprising a pool of physical processors, another rack comprising a pool of physical storage devices, a communication fabric connecting the processors in the rack and the storage devices in the other rack, and a dynamic virtual server manager. The dynamic virtual server manager is configured to receive a workload or data describing a workload, determine respective attributes of the workload in two or more workload dimensions, and configure a virtual server to execute the workload, wherein the virtual server is implemented using one or more processors selected from the pool of processors and one or more storage devices selected from the pool of storage devices. The dynamic virtual server manager is also configured to dynamically adjust a quantity or type of processors or a quantity or type of storage devices used to implement the virtual server based, at least in part, on a change in the workload while executing the workload.

For example, a dynamic virtual server manager may receive a workload or data describing a workload and determine attributes of the workload in multiple workload dimensions, such as a compute dimension, a storage quantity dimension, a storage access frequency dimension, a memory dimension, a network bandwidth dimension, a workload dimension relating to a quantity of active threads for a processing application, as well as various other workload dimensions. The dynamic virtual server manager may select a set of components from server component pools available to the dynamic virtual server manager and configure the virtual server using the selected server components. The selected server components may be assigned to a common name space representing the virtual server, and the virtual server may be represented to outside entities as a physical server having the properties of the constituent components linked together via the common name space that represents the virtual server. In addition, the constituent server components linked together via the common name space may communicate with each other via a high speed internal network such as an NVME over fabric network, a fiber channel network, or other suitable high-speed internal network. The high speed internal network may allow the constituent components of the virtual server to communicate with each other as if they were physically located in a common server chassis, even though they may be physically located in separate chassis or racks.

Also, the dynamic virtual server manager may continue to monitor the workload for changes in workload attributes in multiple workload dimensions while the workload is being executed. In response to detecting a change in one or more workload attributes, the dynamic virtual server manager may adjust the constituent server components that are linked together via the common name space to implement the virtual server. For example, the dynamic virtual server manager may include more or fewer server components or may change types of server components that are linked together via the common name space in response to changing workload attributes. In some embodiments, the dynamic virtual server manager may monitor a workload while it is being executed and may make multiple configuration changes to a virtual server executing the workload in response to changing workload attributes in one or more workload dimensions.

According to some embodiments, a virtual server system includes a pool of processors, a pool of storage devices, a communication fabric, and a dynamic virtual server manager. The dynamic virtual server manager is configured to receive a workload or data describing the workload, determine respective attributes of the workload in two or more workload dimensions, and configure a virtual server to execute the workload, wherein the virtual server is implemented using one or more processors selected from the pool of processors and one or more storage devices selected from the pool of storage devices that are connected via the communication fabric. The dynamic virtual server manager may also be configured to dynamically adjust a quantity or type of processors or a quantity or type of storage devices used to implement the virtual servers based, at least in part, on a change in the workload while executing the workload.

According to some embodiments, a method includes receiving a workload or data describing a workload at a dynamic virtual server manager, determining two or more attributes of the workload in two or more workload dimensions, selecting, from a pool of processors, one or more processors to execute the workload, wherein the one or more processors are selected based, at least in part, on the two or more determined workload dimensions for the workload. The method also includes selecting, from a pool of storage devices, one or more storage devices for executing the workload, wherein the one or more storage devices are selected based, at least in part, on the two or more determined workload dimensions for the workload. The method further includes configuring a virtual server to execute the workload, wherein the virtual server is implemented using the one or more selected processors and the one or more selected storage devices. Additionally, the method may include dynamically adjusting a quantity or type of processors included in the one or more processors; or a quantity or type of storage devices included in the one or more storage devices, wherein the dynamic adjusting is based on a change in the workload while the workload is being executed.

Server components may include various types of computing devices. For example, in some embodiments, server components may include compute server components comprising computing devices, such as processors configured to primarily perform compute operations. For example, a compute server component may include a printed circuit board including one or more processors configured to primarily perform compute operations. In some embodiments, processors included in a compute server component may include single-core, dual-core, or multi-core processors. Also, processors included in a compute server component may include turbo-boost processors, graphics processing units (GPUs), application specific integrated circuits (ASICs), field programmable gate arrays (FPGAs), or other types of processors. Server components may also include storage server components comprising computing devices configured to primarily perform storage operations. For example, a storage server component may include a hard disk drive, a non-volatile memory device, such as a flash memory device, or other suitable type of memory device primarily configured to perform storage operations. Additionally, server components may include memory devices such as ROM, RAM, DRAM, SRAM, SDRAM, DDR SDRAM, RDRAM, and other types of memory. Also server components may include, network interface cards and other components that may be used in a server.

As used herein, a "rack" means a rack that contains or physically supports one or more server chassis. For example, a rack may be an electronic industries alliance (EIA) standard rack or may be a rack that varies from an EIA standard but functions in a similar manner as a standard rack.

In general, servers typically include a fixed set of server components mounted in a common chassis or mounted in adjacent chassis and connected to one another. Often such servers are configured for a primary purpose such as storage, e.g. storage servers, or such as compute operations, e.g. compute servers. However, even though such servers may be configured for a primary purpose, the servers often include at least some server components for performing other tasks. For example, a compute server may include at least some storage components for ancillary usage and storage servers may include at least some processor components for performing tasks related to storing or retrieving data from the storage server. Such ancillary components of special purpose servers may be underutilized. For example, processor capacity dedicated to a storage server may be infrequently used and may remain idle or operate below its capacity for a significant period of time while the storage server is in operation. In a similar manner, networking and/or memory components of a storage server may be underutilized for significant periods of time while the storage server is in operation. In addition, storage associated with a compute server may be infrequently accessed, for example during startup, and may otherwise not be accessed for significant periods of time. As a further example, a startup operation may require a storage able to perform frequent storage accesses, but may only be accessed during startup and may otherwise remain idle.

Also, typical servers with a fixed set of server components may be sized to handle infrequent high intensity workloads.

For example, because such a server is separate from other servers, the server cannot access spare capacity of server components in other servers when experiencing a high intensity workload. Due to this isolation, the server requires a sufficient capacity to perform a high intensity workload on its own. Also, in such servers variations in workload demands are not spread across a larger pool of server components because the server has a limited number of server components that are isolated from other servers.

In some embodiments, a virtual server system may include common pools of server components and a dynamic virtual server manager that links together sets of server components to implement multiple virtual servers. The dynamic virtual server manager may also dynamically adjust the constituent server components of implemented virtual servers as workload demands change for respective workloads being executed by the respective virtual servers. This may allow common pools of server components to be used to implement multiple virtual servers and may reduce under-utilization of server components.

For example, a dynamic virtual server manager may select server components from pools of available server components for use by any of the virtual servers and may release the server components back into the respective pools of available server components when the server components are not presently being used by a virtual server. Thus, server components that are infrequently used, such as processors of a storage server or storage of a compute server, are not prevented from being used by other virtual servers.

Also, because a significant quantity of server components are included in the respective pools of server components, variations in workload intensity may be more evenly distributed than in the case of a server comprising dedicated server components.

For example, one virtual server may experience a high intensity workload for compute operations while another virtual server experiences a lower intensity workload for compute operations. In such a situation, a dynamic virtual server manager may allocate more of the compute capacity of the processor pool to the virtual server executing the workload with the higher intensity compute workload than is allocated to the virtual server executing the workload with the lower intensity compute workload. At another point in time the compute intensities of the respective workloads of the respective virtual servers may be reversed and the dynamic virtual server manager may allocate more compute capacity from the processor pool to the other virtual server. In this way, both of the virtual servers may be able to execute a high compute intensity workload using processors from a pool of processors, wherein the allocated processors have a capacity to perform one of the high compute intensity workloads but a capacity less than would be required to perform both of the high compute intensity workloads at the same time (as would be required for servers with dedicated processors that are not shared).

In some embodiments, a virtual server system may be oversubscribed, wherein guaranteed capacities of virtual servers implemented on the virtual server system exceed respective capacities of the server components of the virtual server system. For example, each virtual server of a set of virtual servers implemented by a virtual server system may have an associated service level agreement (SLA) indicating that the virtual server can store a given amount of data, for example a terabyte per virtual server for five virtual servers. However, a pool of storage devices of the virtual server system may only have the capacity to store less data than the sum of the guaranteed maximum amounts of data, for example the storage device may only have a capacity to store 4 terabytes of data. However, because each of the virtual servers do not simultaneously store the maximum amount of data allowed per the respective SLAs at the same time, a dynamic virtual server manager may ensure that the SLAs are met by reassigning storage server components between the virtual servers as respective storage demands of the virtual servers change. In some embodiments, other server components, such as compute server components, memory server components, networking server components, or other server components may also be oversubscribed.

Also, in some embodiments, respective pools of server components may include different types of server components within a common class that have different performance characteristics. For example, a pool of storage server components may include solid-state storage devices that allow for low latency accesses, hard disk drives that have higher latencies than solid-state drives but lower latencies than other types of storage server components, and tape storage components that have higher access latencies than solid-state drives and hard disk drives. In such embodiments, tape drive server components may store large quantities of data at relatively low cost, hard disk drives may have less storage capacity than a tape drive and may be a higher cost storage medium than tape. In such embodiments, solid-state drives may also have less storage capacity than a tape drive and may be a higher cost storage medium than tape and hard disk drives. In such embodiments, a dynamic virtual server manager may adjust not only a number of storage server components used to implement a virtual server, but also respective types of server components that are used to implement a virtual server. For example, if an access frequency to data stored in a virtual server increases, a dynamic virtual server manager may migrate portions of the data from a tape drive to a hard disk drive or solid state drive. Conversely, if an access frequency to data stored in the virtual server decreases, the dynamic virtual server manager may migrate portions of the data from a solid-state drive to a hard disk drive or to a tape drive. In this way a dynamic virtual server manager may dynamically adjust storage server components to meet current workload attributes in both a data quantity workload dimension and a data access frequency workload dimension.

Additionally, in some embodiments, a pool of compute server components may include different types of compute components within a common class that have different performance characteristics. For example, a pool of compute server components may include single-core processors, dual-core processors, multi-core processors (for example more than two cores), turbo-boost processors, graphics processing unit (GPU) processors, ASIC processors, field programmable gate array (FPGA) processors, and various other types of processors. In such embodiments, a dynamic virtual server manager may adjust a number and/or type of compute server components being used to implement a virtual server based on present workload attributes of the workload, such as compute requirements, number of threads included in the workload, etc.

In some embodiments, a pool of local memory devices may include different sizes and/or types of local memory to be used to implement virtual servers. A dynamic virtual server manager may allocate memory server components to a virtual server based on present workload attributes in one or more workload dimensions and may dynamically adjust the allocation as the attributes of the workload in the one or more workload dimensions change. For example, if a different quantity or type of processors is allocated to a given virtual server, a memory server component allocation may also be adjusted. In a similar manner, a dynamic virtual server manager may adjust allocations of other types of server components from respective server component pools. For example, a dynamic virtual server manager may adjust a number or size of network interface cards being used to implement a virtual server based on changing workload attributes of the virtual server. In this way, a dynamic virtual server manager may "slice the rack vertically instead of horizontally" by organizing servers from pools of server components mounted throughout the rack instead of dividing the rack into shelves of self-contained servers.

In some embodiments, pools of server components of a virtual server system may be included in multiple racks in a common data center or may be included in a common rack. In some embodiments, machine learning techniques may be used to analyze a workload and determine a server component allocation for a virtual server based on the analyzed workload. In some embodiments, one or more pools of server components or types of server components in a pool may be high security server components. For example some server components may be mounted in a secure compartment that prevents unauthorized access. In some embodiments, security requirements may be a workload dimension that is evaluated by a virtual dynamic server manager and that is used by the dynamic virtual server manger to select server components to implement a virtual server.

FIG. 1 illustrates a data center comprising multiple racks, wherein the racks include pools of different types of server components, the data center also includes a network fabric connecting the server components, and a dynamic virtual server manager, according to some embodiments.

Data Center 100 includes multiple server component pools and a dynamic virtual server manager 102. For example, in some embodiments, data center 100 includes a processor pool 104, a storage device pool 106, a network interface pool 108, and a memory device pool 110. The respective server component pools include server components of a common class, e.g. compute, storage, memory, networking, etc., that may be used to implement a virtual server. For example, in response to receiving workload A, dynamic virtual server manager 102 may assign server components from respective ones of the server component pools to a common name space that represents a virtual server being configured to execute workload A.

In some embodiments, the dynamic virtual server manager may analyze workload A in multiple workload dimensions and may select server components to be used to implement a virtual server to execute the workload A based on attributes of workload A in the multiple workload dimensions. In addition, the dynamic virtual server manager 102 may receive another workload, workload B, and may determine attributes of workload B in multiple workload dimensions, wherein the attributes of workload B are different than the attributes of workload A. Also, the dynamic virtual server manager 102 may assign server components from respective ones of the server component pools to a common name space that represents another virtual server that is being configured to execute workload B. Since workload A and workload B have different workload attributes, different combinations of server components may be assigned to the respective virtual servers that are implemented to execute workload A and workload B. In some embodiments, a virtual server system comprising server component pools and a dynamic virtual server manager may concurrently implement any number of virtual servers. For example, dynamic virtual server manager 102 may implement "N" virtual servers to execute workloads A through N. In some embodiments, different ones of the virtual servers may be implemented using different server components based on differences in attributes between workloads that are to be executed using the different virtual servers.

In some embodiments, server components of a common class, such as processor server components, storage server components, network interface server components, or memory device server components, may include server components of a respective class with different performance characteristics. In such embodiments, a dynamic virtual server manager, such as dynamic virtual server manager 102, may select server components within a server component class based on respective performance characteristics of server components in the server component class and based on performance requirements needed to execute a workload having particular workload attributes in multiple workload dimensions.

For example, processor pool 104 includes various types of processors having various performance characteristics, such as single-core processors 112, dual-core processors 114, multi-core processors 116, turbo-boost processors 118, and graphics processing units (GPUs) 120. In some embodiments, a processor pool, such as processor pool 104, may include various other types of processors such as application specific integrated circuits (ASICs), field programmable gate arrays (FPGAs), etc. In some embodiments, a dynamic virtual server manager, such as dynamic virtual server manager 102, may select processor server components from the processor pool 104 based on the performance characteristics of the different types of processors and workload attributes of a workload that is to be executed.

As another example, storage device pool 106 includes various types of storage devices having various performance characteristics, such as solid-state drives 122, hard disk drives 124, and tape drives 126. In some embodiments, a storage device pool, such as storage device pool 106, may include other types of storage devices. In some embodiments, a dynamic virtual server manager, such as dynamic virtual server manager 102, may select storage server components from the storage device pool 106 based on the performance characteristics of the different types of storage devices and workload attributes of a workload to be executed. For example, for a workload with a high quantity of data to be stored that is infrequently accessed, a dynamic virtual server manager, such as dynamic virtual server manager 102, may select a tape drive or a hard disk drive or a combination thereof. And, for a workload with a smaller quantity of data to be stored that is more frequently accessed, a dynamic virtual server manager, such as dynamic virtual server manager 102, may select a solid-state drive or a hard disk drive or a combination thereof.

As yet another example, network interface pool 108 includes various types of network interface cards (NICs), such as mega-byte rated NICs 128, giga-byte rated NICs 130 and terra-byte rated NICs 132. Additionally, as another example, memory device pool 110 includes various types or sizes of memory devices, such as small memory devices 134, medium memory devices 136 and large memory devices 138. In some embodiments, a memory device pool may include memory devices such as ROM, RAM, DRAM, SRAM, SDRAM, DDR SDRAM, RDRAM, and other types of memory. In some embodiments, a network interface pool or a memory device pool, such as network interface pool 108 or memory device pool 110, may include multiple types of network interface devices or memory devices. In some embodiments, a dynamic virtual server manager, such as dynamic virtual server manager 102, may select network interface device server components from the network interface pool 108 or may select memory device server components from the memory device pool 110 based on the performance characteristics of the different types of devices and workload attributes of a workload to be executed.

In some embodiments, server components of processor pool 104, storage device pool 106, network interface pool 108, and memory device pool 110 may be mounted in a same rack (as shown in FIG. 5) or in more than one rack (as shown in FIG. 1). For example, in data center 100 server components of processor pool 104, server components of storage device pool 106, server components of network interface pool 108 and server components of memory device pool 110 are each mounted separate respective racks 140.

In some embodiments, server components of different server component pools and server components within a server component pool are connected to each other via a high-speed internal network, internal to a data center in which a virtual server system is implemented or internal to a rack in which a virtual server system is implemented. For example server components of processor pool 104, storage device pool 106, network interface pool 108, and memory device pool 110 are connected to one another via communication fabric 142, which is an internal network to data center 100, and which, in some embodiments, may be an internal network within a rack chassis. For example, constituent server components may be linked together via a common name space and may communicate with each other via a high speed internal network such as an NVME over fabric network, a fiber channel network, or other suitable high-speed internal network. The high speed internal network may allow the constituent components of a virtual server to communicate with each other as if they were physically located in a common server chassis, even though they may be physically located in separate chassis or racks. In some embodiments, server components may communicate with each other over a high speed internal network according to a RDMA (remote direct memory access) protocol, an ISCSI protocol, or other suitable high-speed protocol. In some embodiments, memory devices, such as memory devices of memory device pool 110, may include an interface to enable high-speed communications over an internal high-speed network, such as an Intel OMNI path interface or other suitable interface.

In some embodiments, a dynamic virtual server manager, such as dynamic virtual server manager 102, may dynamically adjust a combination in either type or quantity of server components that are assigned to a common namespace as a virtual server configured to execute a workload based on changes in one or more attributes of the workload in one or more workload dimensions.

Figure 2A:
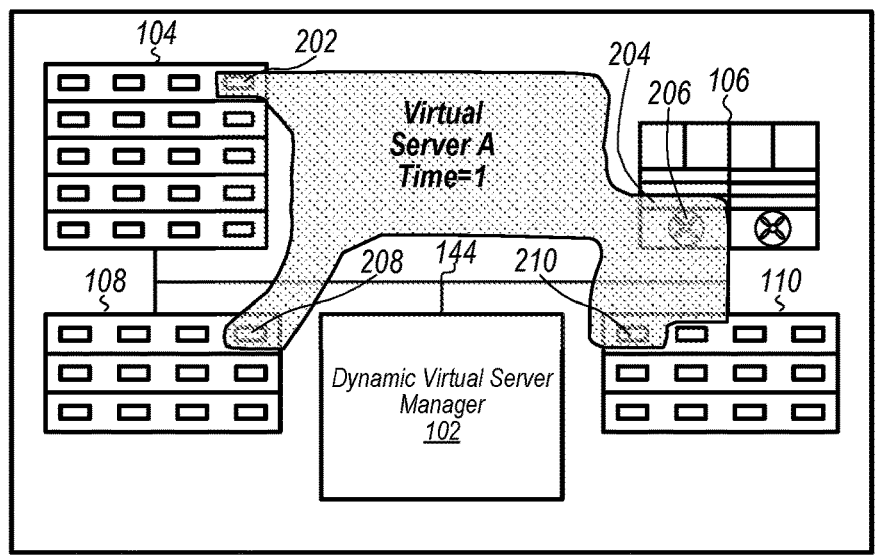
FIGS. 2A-2C illustrate a virtual server configuration being dynamically adjusted due to changes in workload attributes, according to some embodiments.
Figure 2B:
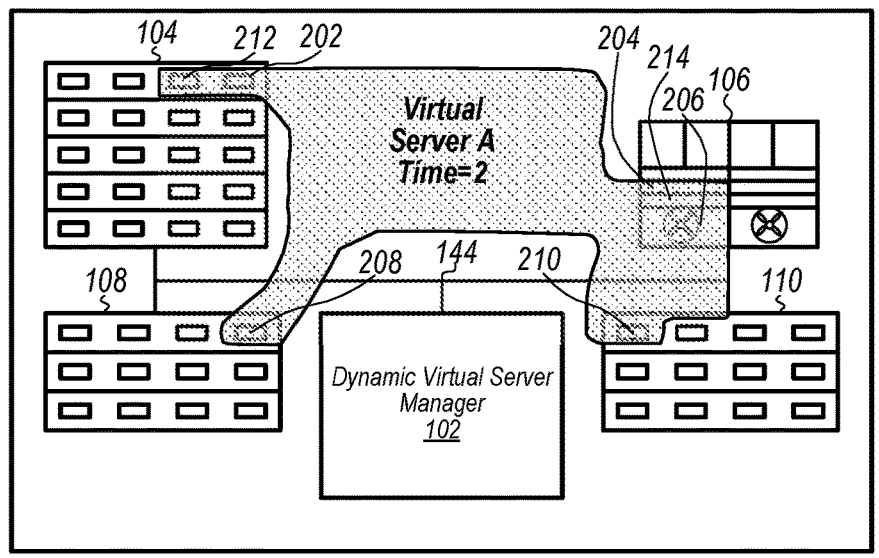
Figure 2C:
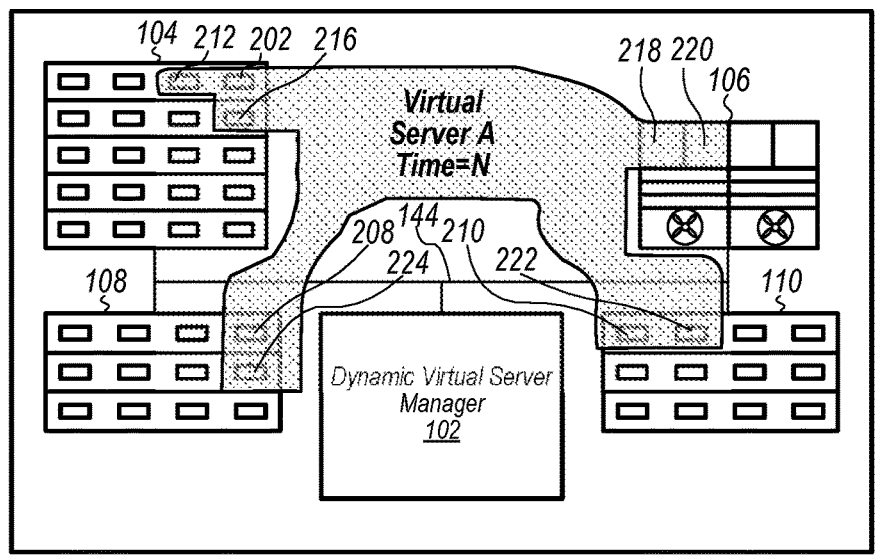

FIGS. 2A-2C illustrate a virtual server configuration being dynamically adjusted due to changes in workload attributes, according to some embodiments.

FIG. 2A illustrates virtual server A at time 1. At time 1, virtual server A may have an initial configuration that includes server components selected based on an initial analysis of a workload to be executed by virtual server A or may be a subsequent configuration of virtual server A that has been adjusted based on changes in one or more attributes in one or more workload dimensions of a workload being executed by virtual server A. In the configuration shown in FIG. 2A virtual server A includes a single-core processor 202 of processor pool 104, hard disk drive 204 and tape drive 206 of storage device pool 106, mega-byte network interface card of network interface pool 108, and small memory device 210 of memory device pool 110.

As an example illustration of a dynamic adjustment of a virtual server, FIG. 2B illustrates virtual server A at time 2. At time 2, a configuration of virtual server A has been adjusted based on one or more changes in one or more attributes in one or more workload dimensions of a workload being executed by virtual server A. For example, in a compute workload dimension, the workload being executed by virtual server A may have changed to require more compute capacity. Also, in a storage quantity workload dimension, the workload being executed by virtual server A may have changed to require more storage capacity for medium latency access storage. Based on these changes in the compute workload dimension and the storage quantity workload dimension the combination of server components that implements virtual server A may be adjusted by a dynamic virtual server manager while the workload is being executed by virtual server A. For example, at time 2 virtual server A has been adjusted to include an additional single-core processor 212 and an additional hard disk drive 214.

In some embodiments, a dynamic virtual server manager may periodically or in response to one or more triggers, re-evaluate a workload in one or more workload dimensions and in response to changes in the workload, dynamically adjust a configuration of a virtual server that executes the workload.

For example, FIG. 2C illustrates virtual server A at time N. In comparison to the configuration of virtual server A at time 2, an additional dual core processor 216 of processor pool 104 has been added to the virtual server configuration. For example a compute dimension of the workload being executed by virtual server A may have changed to require more compute capacity or a number of active threads being executed by virtual server A may have increased due to changes in the workload being executed by virtual server A. Additionally, the configuration of virtual server A at time N includes solid-state drives 218 and 220, no longer includes hard disk drives 204 and 214, and also no longer includes tape drive 206. For example in a storage access frequency dimension the workload being executed by virtual server A may have changed from being able to tolerate medium to high latency storage access to instead requiring low latency storage access. Also, the configuration of virtual server A at time N includes two small memory devices, small memory device 210 and an additional small memory device 222. For example, adding an additional dual core processor 216 may have changed a memory workload dimension of the workload being executed by virtual server A to require more RAM memory. Furthermore, the configuration of virtual server A at time N includes an additional giga-byte network interface card 224 in addition to the mega-byte network interface card 208 that was previously included in the configuration of virtual server A at time 2. For example, the workload being executed by virtual server A may have changed in a network bandwidth workload dimension such that the virtual server executing the workload requires more bandwidth to communicate with outside entities, such as other servers or clients in order to execute the workload being executed by virtual server A.

Note that FIGS. 2A-2C illustrate example configuration changes due to example workload attribute changes, but should not be viewed as limiting. For example various other combinations of server components from the various server component pools may be linked together via a common name space to configure a virtual server with any number of performance capabilities that are selected to match any number of workload attribute combinations in various workload dimensions.

In some embodiments, dynamic adjustments to a virtual server may be performed by a dynamic virtual server manager without client interaction, for example to ensure SLA performance guarantees are met. Also, in some embodiments dynamic adjustments to a virtual server may be performed in response to client initiated adjustments or in response to a client accepting a configuration adjustment recommendation. For example, a dynamic virtual server manager may recommend a client change an SLA to achieve better performance or a client may initiate a change to an SLA. In response to a changed SLA, a dynamic virtual server manager may change a virtual server configuration to meet changed performance guarantees that have changed due to the changing of the SLA.

Additionally, in some embodiments a workload dimension that is managed by a dynamic virtual server manager may include a durability workload dimension. For example, between time 1 and time 2 a client may have requested a more durable SLA guarantee for data stored by virtual server A. For this reason, data stored in hard disk drive 204 may have been partially replicated to hard disk drive 214 to create redundancy such that if hard disk drive 204 failed, the data was durable because it is also stored on hard disk drive 214.

Figure 3A:
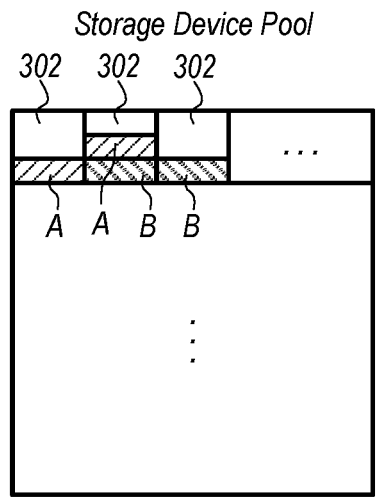
FIG. 3A illustrates storage for two different workloads that are distributed across multiple data storage devices, according to some embodiments.

As a further example, FIG. 3A illustrates storage for two different workloads that are distributed across multiple data storage devices, according to some embodiments. For example, a virtual server executing workload A includes data stored on two different storage devices 302 and a virtual server executing workload B includes data stored on a single storage device 302.

Figure 3B:
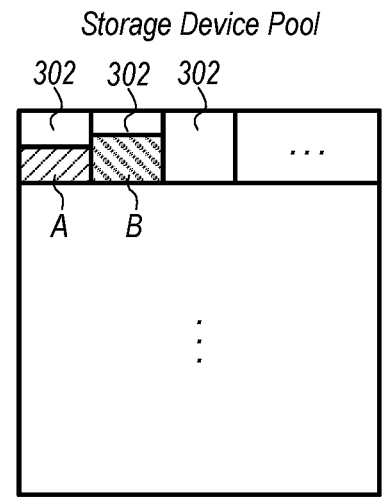
FIG. 3B illustrates storage for two different workloads that are stored on separate data storage devices, according to some embodiments.

FIG. 3B illustrates storage for two different workloads that are stored on separate data storage devices, according to some embodiments. In some situations, a workload durability requirement for workloads A and B (as shown in FIG. 3A) may decrease, and in response the virtual servers executing workloads A and B may be dynamically adjusted to store data for workload A on fewer storage devices 302, (for example a single storage device 302), and store data for workload B on fewer storage devices (for example a single storage device 302). In a similar manner, a workload durability requirement for a workload, such as either workload A or workload B, may increase, and in response a virtual server executing the workload may be dynamically adjusted to store data for the workload across more storage devices. For example, the virtual server executing workload A or workload B as shown in FIG. 3B could be adjusted to store data for workload A or workload B across multiple storage devices (as shown in FIG. 3A).

Figure 3C:
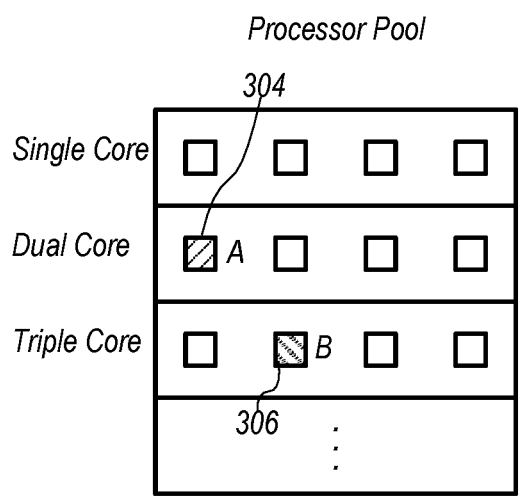
FIG. 3C illustrates processors for two different workloads that are implemented on separate processors, according to some embodiments.

Also a workload durability requirement may influence a number or type of processors that are selected to implement a virtual server configured to execute a workload. For example, in FIG. 3C a single dual core processor 304 is used to implement a virtual server for executing workload A and a single triple-core processor 306 is used to implement a virtual server for executing workload B. However, a workload durability requirement in relation to processor resiliency may change for a workload, such as workloads A or B. For example a client may select an SLA for a virtual server, such as the virtual servers that execute workloads A and B, that has a higher durability requirement than a durability requirement for a previous SLA for the servers.

In response to a change in a durability requirement in relation to processor resiliency, a dynamic virtual server manager may change a configuration of a virtual server, such as the virtual servers that execute workloads A and B, to have greater processor resiliency or less processor resiliency. For example, by adjusting a virtual server executing a workload from being implemented using a single dual-core processor to instead being implemented using two single-core processors a processor resiliency of the virtual server may be increased. This is because if one of the two single-core processors were to fail, another one of the single-core processors would remain in operation. In contrast, a failure of a single dual-core processor may halt the workload completely until replacement processor server components are allocated to the virtual server executing the workload. However, a dual-core processor may provide better performance and/or efficiency than two single-core processors. Thus, depending on workload attributes and SLA guarantees, different configurations may be selected to implement a virtual server to execute a particular workload, in some embodiments.

Figure 3D:
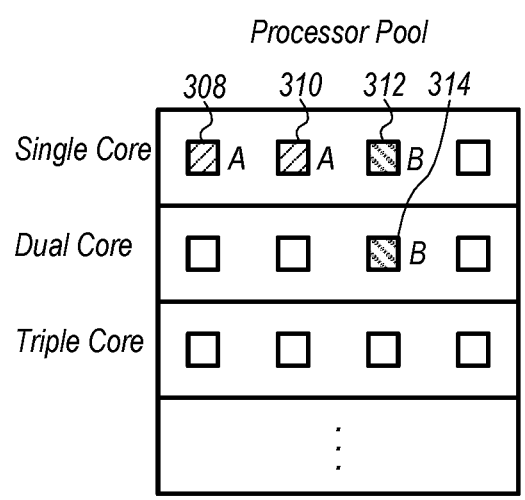
FIG. 3D illustrates processors for two different workloads, wherein the workloads are implemented across more than one processor, according to some embodiments.

For example FIG. 3D illustrates processors for two different workloads, wherein the workloads are implemented across more than one processor, according to some embodiments. As illustrated in FIG. 3D, the virtual server that executes workload A may be adjusted to include two single-core processors 308 and 310 instead of dual-core processor 304. As another example, the virtual server that executes workload B may be adjusted to include a single-core processor 312 and a dual-core processor 314 instead of triple-core processor 306. Thus the processor resiliency of the virtual servers that execute workloads A and B are greater in FIG. 3D than in FIG. 3C because a single processor failure does not affect all of the processing capacity of one of the virtual servers. However, as also can be seen, such arrangements may require more processors to implement a virtual server.

In some embodiments, a data storage device pool may include an interface device that assigns storage space on storage devices of the storage device pool to a name space of a virtual server. In some embodiments, an interface device may receive storage operations directed to the assigned name space and may cause the storage operations to be performed on the storage space on the storage devices assigned to the name space.

Figure 4:
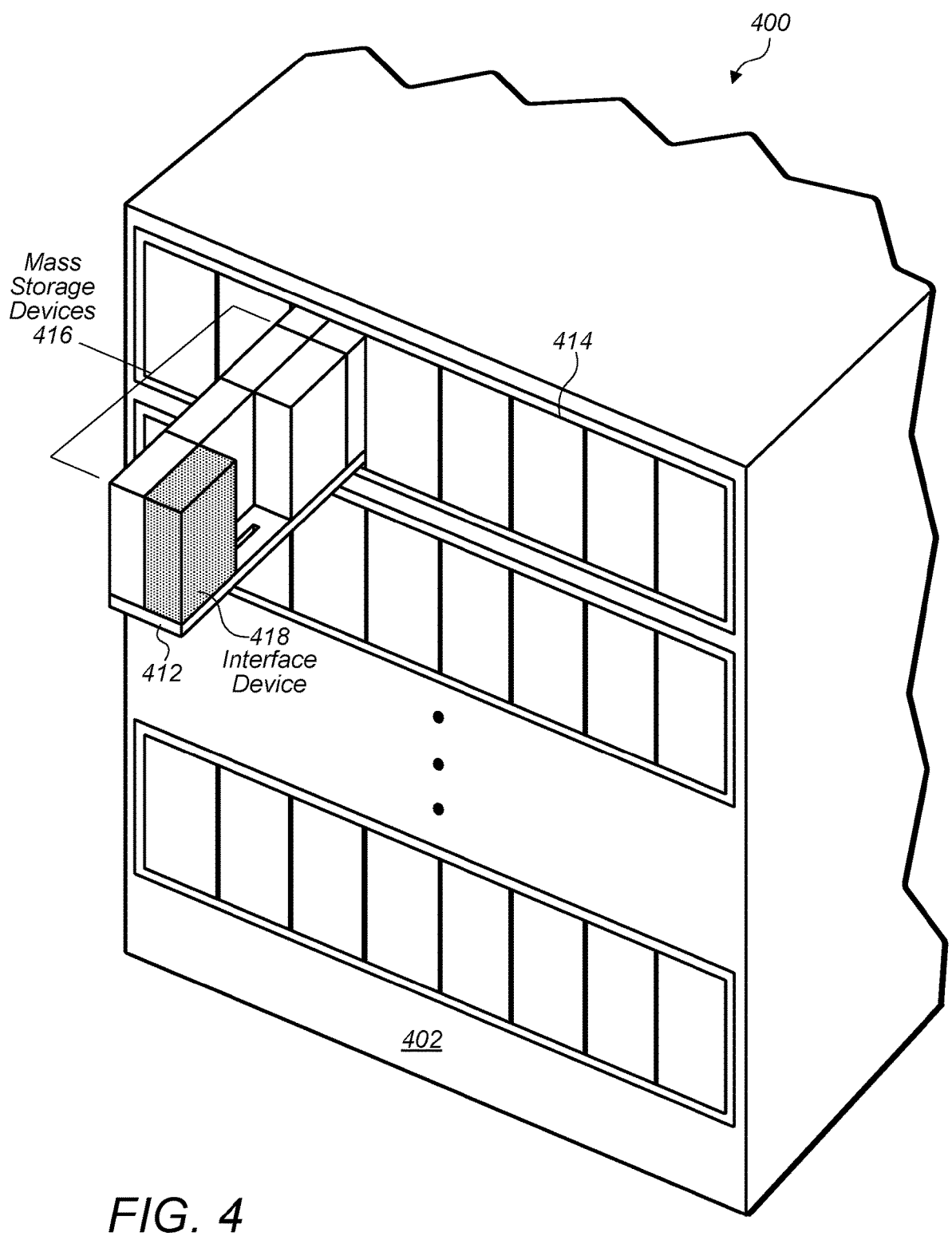
FIG. 4 illustrates a rack that includes data storage devices and at least one interface device connected to a network fabric, according to some embodiments.

For example, FIG. 4 illustrates a rack that includes data storage devices and at least one interface device connected to a network fabric, according to some embodiments.

System 400 includes rack 402 comprising multiple arrays of server component slots. FIG. 4 illustrates sled 412 partially extended out of chassis 414 of system 400. Mass storage devices 416 and interface device 418 are mounted in slots of an array of server component slots of sled 412.

In some embodiments, an interface device, such as interface device 418, may include one or more network ports and be configured to communicate with a dynamic virtual server manager, such as dynamic virtual server manager 102 (illustrated in FIGS. 1 and 2A-C). For example, interface device 418 may be configured to receive read and write requests to read data from and write data to mass storage devices 416.

Figure 5A:
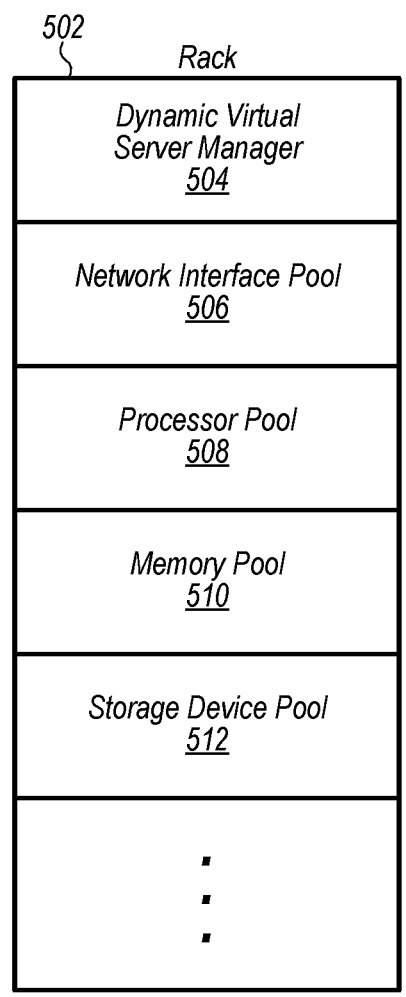
FIG. 5A illustrates a rack that includes a dynamic virtual server manager and multiple server component pools, according to some embodiments.

FIG. 5A illustrates a rack that includes a dynamic virtual server manager and multiple server component pools, according to some embodiments. In some embodiments, a virtual server system may include server components mounted in multiple racks, as illustrated in FIGS. 1-2 and in other embodiments, a virtual server system may include server components locally mounted in a common rack or chassis. For example, rack 502 includes dynamic virtual server manager 504 mounted in rack 502 along with server components of network interface pool 506, server components of processor pool 508, server components of memory device pool 510, and server components of storage device pool 512. Additionally, in some embodiments a server system mounted within a common rack may include other server components.

Figure 5B:
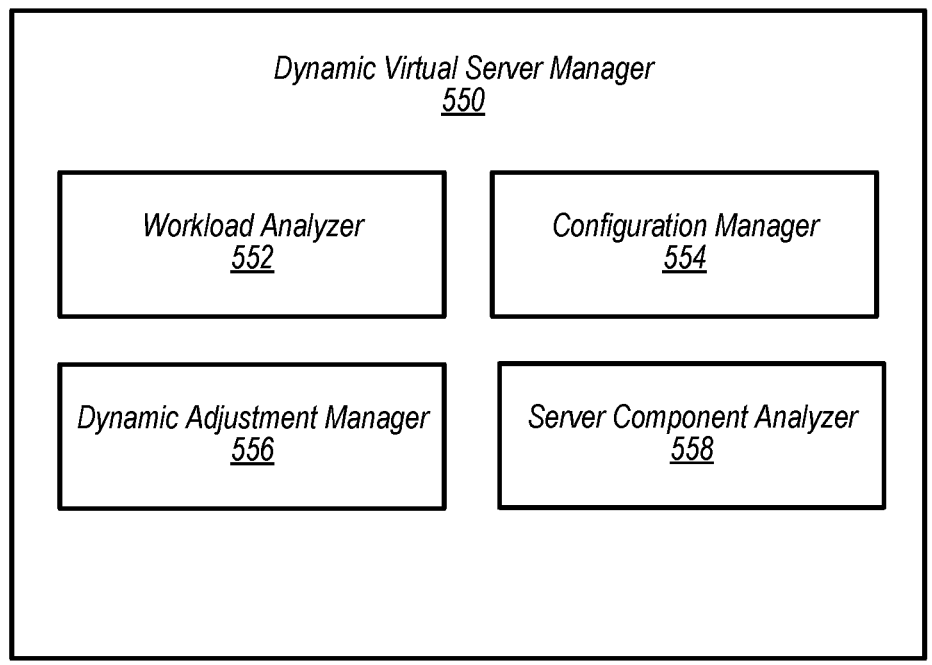
FIG. 5B illustrates components of a dynamic virtual server manager, according to some embodiments.

FIG. 5B illustrates components of a dynamic virtual server manager, according to some embodiments.

Dynamic virtual server manager 550 includes workload analyzer 552, configuration manager 554, dynamic adjustment manager 556, and server component analyzer 558. In some embodiments, dynamic virtual server manager 102 as illustrated in FIGS. 1 and 2 may include components similar to dynamic virtual server manager 550 illustrated in FIG. 5B. In some embodiments, a dynamic virtual server manager may be implemented via software executed on a computing device of a virtual server system. For example, a rack may include at least one server that implements a dynamic virtual server manager and may further include one or more pools of server components that the dynamic virtual server manager uses to implement virtual servers to execute workloads. In some embodiments, a dynamic virtual server may be implemented on a separate computing device separate from one or more pools of server components. Also, in some embodiments, a dynamic virtual server manager may be implemented in hardware as opposed to software, or a combination thereof.

In some embodiments, a workload analyzer, such as workload analyzer 552, may receive a workload or data describing a workload. The workload analyzer may analyze the workload or data describing the workload across multiple workload dimensions, such as a compute workload dimension, a storage quantity workload dimension, a storage access requirement workload dimension, a memory workload dimension, a bandwidth workload dimension, a durability workload dimension, a processor resiliency workload dimension, and/or other workload dimensions. For one or more of the analyzed workload dimensions the workload analyzer may determine workload attributes of the workload in the respective workload dimension. For example, the workload analyzer may determine that the workload is predicted to have a certain level of processing requirements, a certain amount of data storage, a certain amount of storage IOPS, a certain network bandwidth, etc. The workload analyzer may then communicate the determined workload attributes to a configuration manager of a dynamic virtual server manager, such as configuration manager 554 of dynamic virtual server manager 550.

In some embodiments, a configuration manger may select server components from one or more server component pools and assign the selected server components to a common name space for a virtual server being implemented to execute a workload. In some embodiments, a configuration manager may select respective types of server components and respective quantities of server components to be used to implement a virtual server based on determined workload attributes for the workload to be executed by the virtual server. For example, a configuration manager may select one or more processor server components that most closely match a determined workload attribute in a compute capacity workload dimension for a workload to be executed by a virtual server. In a similar manner, a configuration manager may select a set of one or more storage server components from a storage device pool that most closely match a workload attribute in a storage quantity workload dimension and that also most closely match a workload attribute in a storage access frequency workload dimension for a workload to be executed by a virtual server. In some embodiments, server component selection for one or more types of server components may influence server component selection for other types of server components. For example, in some embodiments, a configuration manager may select one or more memory server components from a memory device pool based on a determined attribute of a workload in a memory workload dimension and based on a number or type of processor server components selected to implement the virtual server.

In some embodiments, a dynamic adjustment manager, such as dynamic adjustment manager 556, may determine whether a dynamic adjustment is triggered. In some embodiments, a dynamic adjustment may be triggered based on amount of elapsed time. For example, a virtual server may be evaluated for dynamic adjustment every 30 seconds, as an example. In some embodiments, a dynamic adjustment may be triggered if one or more workload attributes change more than a threshold amount from values determined in a previous workload analysis. Also, in some embodiments, a dynamic adjustment may be triggered at the completion of a discrete task of a workload.

In some embodiments, a dynamic adjustment manager may balance efficiency improvements, server component availability, and overhead required to dynamically adjust a virtual server when determining whether a dynamic adjustment is to be triggered. For example, in some embodiments, a dynamic adjustment may only be triggered if efficiency improvements due to the dynamic adjustment are greater than overhead costs associated with dynamically adjusting the virtual server. In some embodiments, a dynamic adjustment manager, such as dynamic adjustment manager 556, may work with a workload analyzer to determine whether a dynamic adjustment is to be triggered. For example, a dynamic adjustment manager may receive updated workload attribute information from a workload analyzer, such as workload analyzer 552, and use the received updated workload attribute information to determine whether a dynamic adjustment is to be triggered.

In some embodiments, a dynamic adjustment manager, may cause a configuration manager to reconfigure a virtual server if a dynamic adjustment is triggered. For example, a dynamic adjustment manager may instruct a configuration manager to adjust a quantity or type of one or more server components being used to implement a virtual server.

In some embodiments, a server component analyzer, such as server component analyzer 558, may detect server components included in a server component pool or server components added to a server component pool. In some embodiments, the server component analyzer may read stored information associated with the server component to determine one or more characteristics of the server component. For example, a server component analyzer may detect that a storage device has been added to a storage device pool and may read data stored on the storage device to determine characteristics of the storage device, such as a rated storage capacity, a rated IOPS throughput, a type of the storage device (e.g. solid-state, hard disk drive, tape, etc.). As another example, a server component analyzer may detect that a processor has been added to a processor pool and may determine from the processor that it is a single, dual, triple, etc. core processor, a processor capacity of the processor, and/or other characteristics of the processor. In some embodiments, a server component analyzer may additionally or alternatively determine characteristics of server components based on observed or historical performance. For example, a server component analyzer may observe a quantity of IOPS executed by a storage device to determine a storage access requirement characteristic of the storage device.

Figure 6:
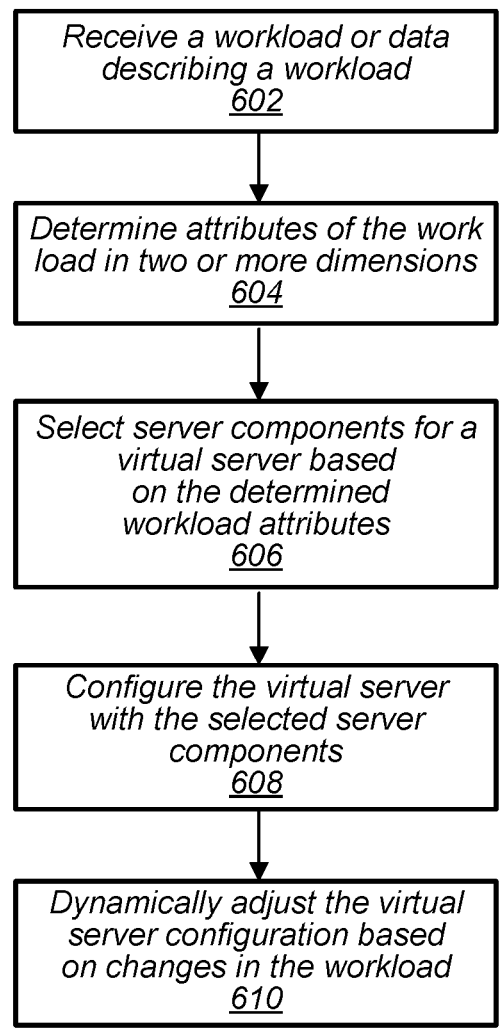
FIG. 6 illustrates a process for operating a dynamic virtual server, according to some embodiments.

FIG. 6 illustrates a process for operating a dynamic virtual server, according to some embodiments. For example, a dynamic virtual server manager, such as dynamic virtual server manager 102, may perform a process as illustrated in FIG. 6.

At 602, a dynamic virtual server manager receives a workload or data describing a workload. For example, a dynamic virtual server manager may receive a request from a client to execute a workload. The request may include data indicating an amount of data to be stored as part of executing the workload, a number of processes involved in executing the workload, an amount of computational resources required to execute the workload, a network bandwidth required by a virtual server executing the workload to send and receive data to or from external devices outside of the virtual server, or a memory requirement for executing the workload. In some embodiments, data about the workload may include historical data indicating historical workload attributes of the workload in multiple workload dimensions.

At 604, the dynamic virtual server manager determines attributes of the workload in two or more workload dimensions. In some embodiments, the attributes of the workload may be determined based on historical data associated with the workload or based on characteristics of the workload, such as an amount of data to be stored with the workload, a level of complexity of code associated with the workload, anticipated user demand for the workload (such as anticipated traffic for web-based workloads), etc. Also, in some embodiments, a dynamic virtual server manager may predict future workload attributes for a workload in multiple workload dimensions based on extrapolation of historic workload information or based on characteristics of the workload. In some embodiments, a dynamic virtual server manager may employ machine learning techniques to improve accuracy of workload attribute determinations.

At 606, the dynamic virtual server manager selects server components to implement a virtual server to execute the workload based on the workload attributes of the workload in two or more workload dimensions. For example, the dynamic virtual server manager may select server components that have capacities and capabilities that match current workload attributes of the workload. Also, the dynamic virtual server manager may select server components that meet current workload requirements without or with minimal overcapacity. For example, a dynamic virtual server manager may select a storage device server component that has sufficient capacity to store a current amount of data to be stored as part of executing the workload while minimizing excess storage capacity reserved for the virtual server implemented to execute the workload. By minimizing excess reserved capacity, the dynamic virtual server manager may allow more capacity to remain available for use by other virtual servers implemented to execute other workloads.

At 608, a virtual server implemented on the selected server components is configured. In some embodiments, a name space may be assigned to the virtual server and server components selected to implement the virtual server may be assigned to the common name space that represents the virtual server. For example, a dynamic virtual server manager may route communications between selected server components using a common name space and a high-speed internal network. Also, storage space on storage devices may be reserved for the common name space. A processor server component may then read and write data to a storage device having a reserved portion for the common name space. In some embodiments, an intermediary device may be used to read and write data to a portion of a storage device assigned to the common name space of the virtual server. In a similar manner, a network interface may have a particular network address, such as an internal or public IP address assigned to the common name space, wherein communications to and from the network address are routed from the network interface to a processor server component assigned to the common name space. In some embodiments, a dynamic virtual server may load balance between multiple processor server components assigned to a common name space, or a virtual server system may include a load balancer server component that may be used to implement a virtual server and that may be assigned to a common name space to perform load balancing operations for the virtual server.

At 610, the dynamic virtual server manager dynamically adjusts the virtual server configuration due to changes in one or more workload attributes of the workload being executed by the virtual server. The changes may be in one or more workload dimensions of the workload and may result in a different number or different types of server components being used to implement the virtual server. For example, if a workload attribute in a storage access frequency workload dimension increases such that lower latency storage is needed, a dynamic virtual server manager may migrate data stored for the workload from higher latency storage, such as a tape drive or hard drive, to a lower latency storage, such as a solid-state drive. As another example, if a workload attribute in a number of active threads workload dimension changes, a dynamic virtual server manager may assign more or fewer processors to the common name space that represents the virtual server or may migrate one or more processes of the workload to a processor with more or fewer cores. As yet another example, if a clock speed or number of instructions executed per unit of time workload attribute changes, a dynamic virtual server manager may assign more or fewer processors to the common name space that represents the virtual server or may migrate one or more processes of the workload to a different type of processor with different performance characteristics that more closely match the changed workload attribute. In some embodiments, a live migration may be performed to migrate one or more processors of a virtual server to one or more other processors. In some embodiments, processor migration may be performed between discrete tasks by booting up a replacement processor at the completion of a discrete task and before executing the next discrete task.

Figure 7:
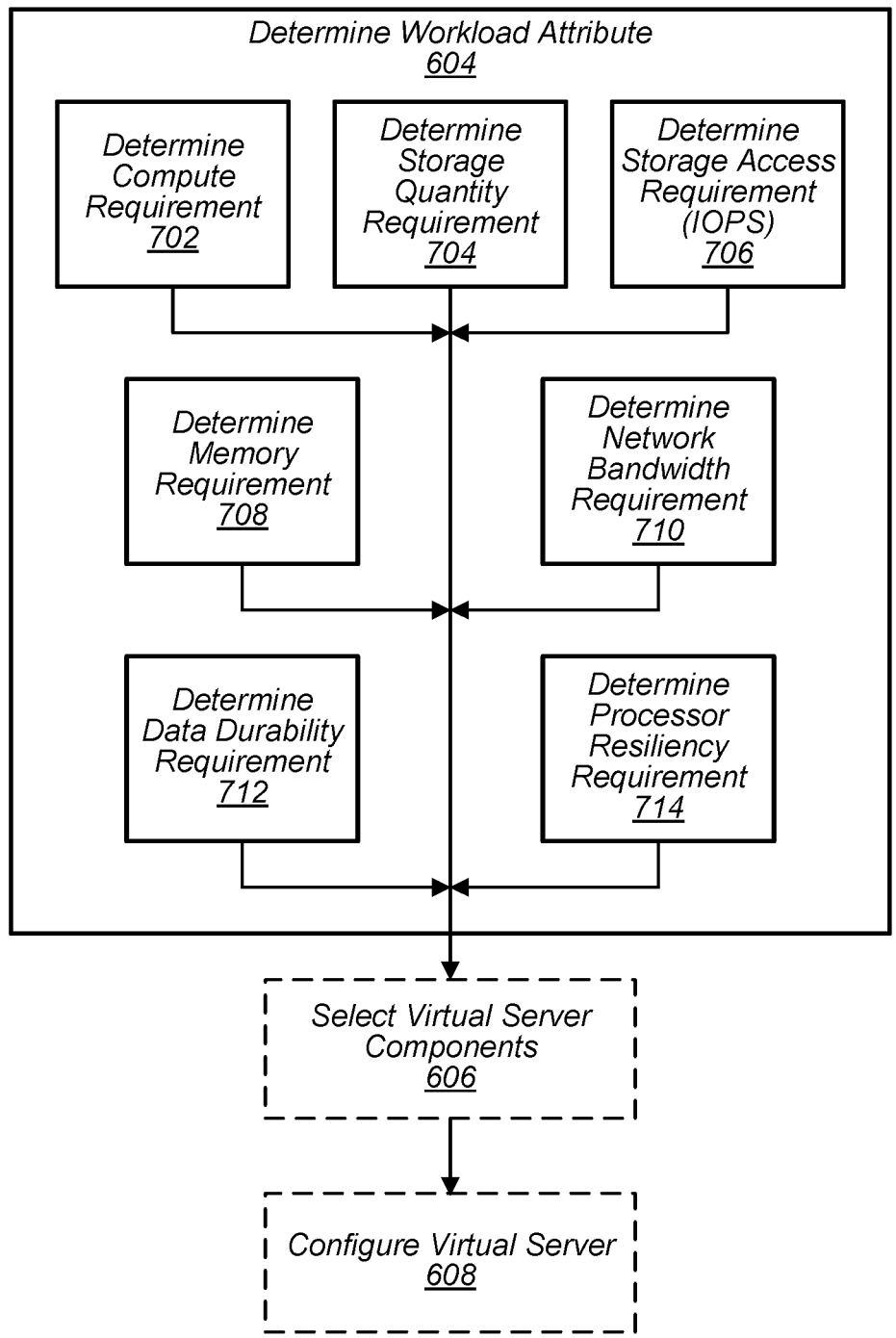
FIG. 7 further illustrates determining workload attributes in multiple dimensions for configuring a dynamic virtual server, according to some embodiments.

FIG. 7 further illustrates determining workload attributes in multiple dimensions for configuring a dynamic virtual server, according to some embodiments. For example, FIG. 7 illustrates example workload dimensions for which a workload attribute may be determined, for example as in 604 of FIG. 6.

At 702 a compute requirement attribute for a workload is determined for the workload. A compute requirement attribute may include a number of instructions per second to be executed, a required clock speed for executing the workload, a number of active processing threads required to execute the workload, or other attributes describing processor capabilities and/or performance needed to execute the workload.

At 704, a data storage quantity requirement is determined for the workload. A data storage quantity requirement may include an amount of storage space that will be needed to store data for the workload. For example, a data storage quantity requirement may include a number of bytes of data that is to be stored, a number of files or volumes that are to be stored, etc.

At 706, a storage access requirement attribute for the workload is determined. A storage access requirement may include a number of input/output operations per second that the virtual server or a storage of the virtual server will be required to process, such as a number of IOPS. Also, a storage access requirement attribute may also be defined in terms of a latency for access to data stored by a virtual server for the workload such as a latency time.

At 708, a memory requirement attribute for the workload is determined. In some embodiments, a memory requirement attribute may be determined based on code to be executed by the workload, for example an anticipated amount of local memory required to execute the code. In some embodiments, a memory requirement attribute may be determined based on other workload attributes, such as a compute requirements attribute for the workload.

At 710, a network bandwidth requirement is determined for the workload. A network bandwidth requirement may indicate an amount of bandwidth to and from the virtual server that will be required to execute the workload. For example, a workload may be related to a web-server that receives requests from outside parties and that requires a particular amount of bandwidth external to the virtual server to communicate with outside parties.

At 712, data durability requirements are determined for the workload. In some embodiments, a client submitting a workload may indicate data durability requirements for the workload. Also, in some embodiments, data durability requirements may be inferred based on types of data being stored.

At 714, processor resiliency requirements are determined for the workload. In some embodiments, a client submitting a workload may indicate processor resiliency requirements for the workload. Also, in some embodiments, processor resiliency requirements may also be inferred from a workload. For example, some workloads may include processes that can be started and stopped without incident, while other workloads may include processes that if stopped must be re-started from the beginning. Such re-starts may be costly and negatively impact performance. Whereas, processes that can be started and stopped without incident may not incur equivalent costs or performance losses if stopped. In some embodiments, a workload analyzer may distinguish between such different types of processes and select processor server component combinations with greater processor resiliency for processes that are negatively impacted by starting and stopping and selecting processor combinations with less processor resiliency for processes that are only minimal impacted by starting and stopping. In some embodiments, a workload analyzer may analyze code associated with a workload to determine which type of processes the workload includes. Also, in some embodiments, a workload analyzer may analyze historical data associated with the workload to determine which types of processes the workload includes.

Based on workload attributes in at least two of the workload dimensions described in 704 through 714, a dynamic virtual server manager may select server components for implementing a virtual server to execute the workload as described in 606 and may configure a virtual server as described in 608. Also, at least some of the workload dimensions described in 704 through 714 may be continuously or periodically re-evaluated and updated. In response to one or more changes in workload attributes for one or more workload dimensions, a dynamic virtual server may update a virtual server configuration based on the changes in the workload attributes of the workload while it is being executed by the virtual server.

Figure 8:
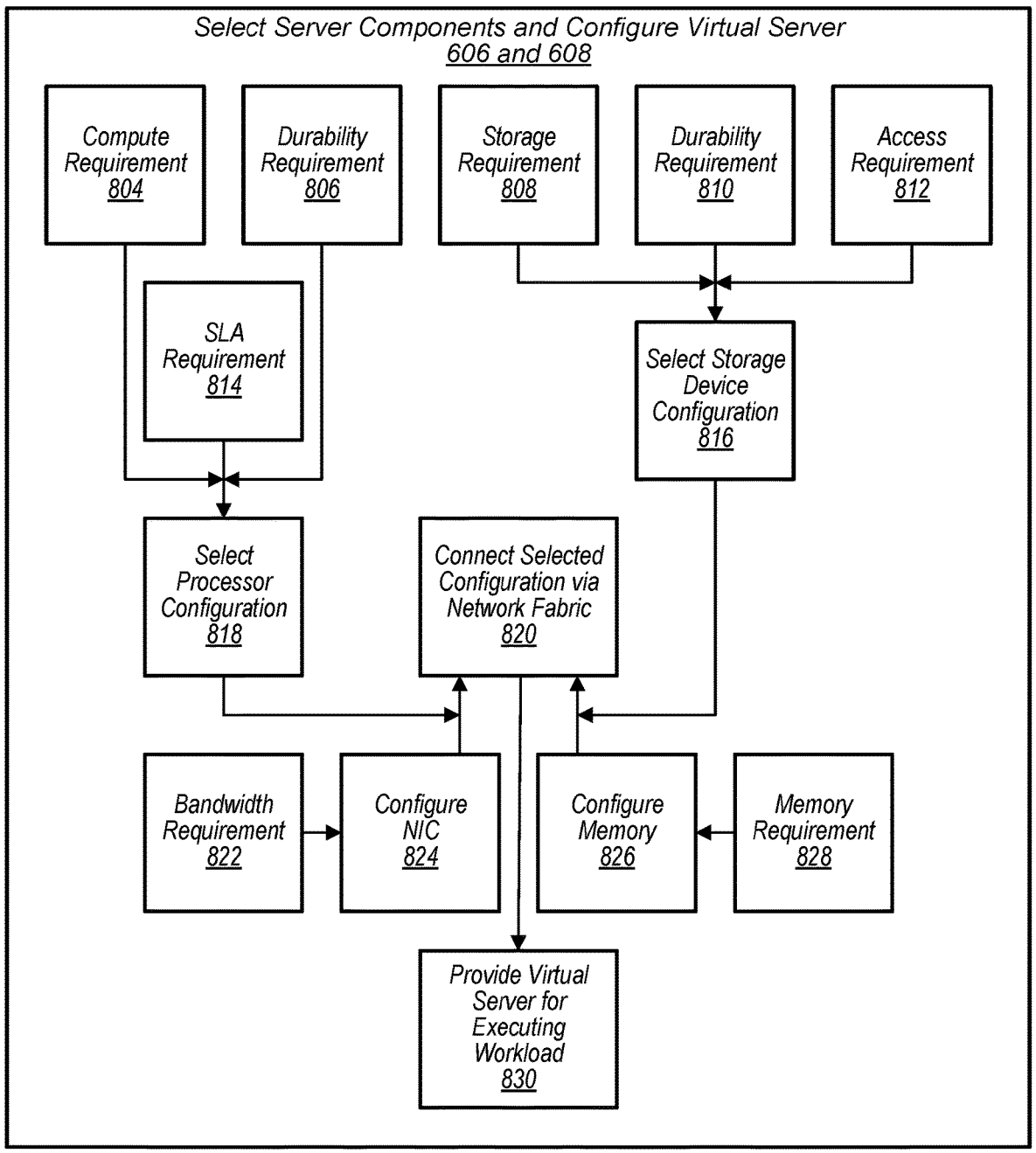
FIG. 8 further illustrates configuring a virtual server in accordance with determined workload attributes, according to some embodiments.

FIG. 8 further illustrates configuring a virtual server in accordance with determined workload attributes, according to some embodiments. In some embodiments selecting server components and configuring a virtual server as described in 606 and 608 may include at least some of the steps described in FIG. 8. For example, in some embodiments, a processor configuration may be selected, at 818, based on compute requirements 804, processor resiliency requirements 806, and service level agreement (SLA) requirements 814.

As another example, a storage device configuration may be selected, at 816, based on storage quantity requirements 808, storage durability requirements 810, and storage access requirements 812. Also, a network interface card configuration may be determined at 824, based, at least in part, on a bandwidth requirement for the virtual server 822. Also a memory configuration may be determined at 826, based on memory requirements for executing the workload 828.

At 820, a dynamic virtual server manager connects selected server components in the determined configurations 818 (processor configuration), 816 (storage device configuration), 824 (NIC configuration), and 826 (memory configuration) via a common name space to implement the virtual server. At 830, the dynamic virtual server manager makes the configured virtual server available for executing the workload.

Figure 9E:
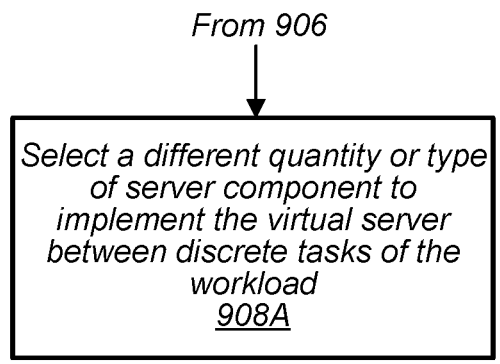
FIGS. 9E and 9F illustrate example reconfiguration processes for reconfiguring a virtual server, according to some embodiments.
Figure 9F:
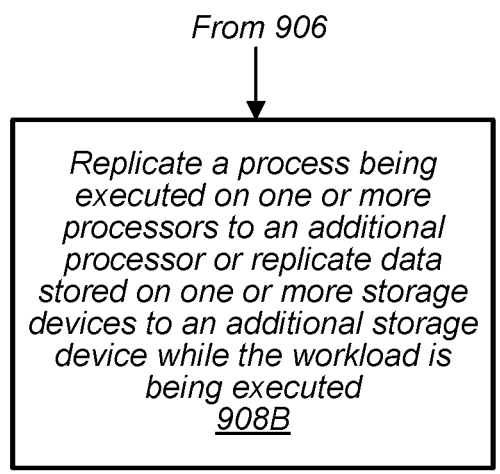

FIG. 9A further illustrates dynamically adjusting a virtual server configuration due to changes in workload attributes, according to some embodiments. In some embodiments, dynamically adjusting a virtual server configuration as described in 610 of FIG. 6 may further include at least some of the steps described in FIG. 9A. Also FIGS. 9B-9D illustrate example adjustment intervals that may trigger a reconfiguration of a virtual server and FIGS. 9E and 9F illustrate example reconfiguration processes for reconfiguring a virtual server, according to some embodiments.

At 904, a dynamic virtual server manager determines whether an adjustment interval has been reached for a virtual server executing a workload. In some embodiments, an adjustment interval may be time based. For example, FIG. 9B shows an adjustment interval 904A that is triggered when an adjustment time interval is reached. As another example, FIG. 9C shows an adjustment interval 904B that is based on a change in a workload attribute in one or more workload dimensions changing more than a threshold amount from a workload attribute used to configure the virtual server. As yet another example, FIG. 9D shows an adjustment interval 904C being reached when a discrete task of a workload is completed. For example a workload may include multiple discrete tasks, such as processing orders, and a dynamic virtual server manager may re-evaluate workload attributes between discrete tasks of the workload to determine whether a virtual server executing the workload is to be dynamically adjusted.

When an adjustment interval is reached at 904 (for example due to time, workload attribute changes, task completion, etc.), the dynamic virtual server manager, at 906, determines current workload attributes in one or more workload dimensions. At 908, the dynamic virtual server manager reconfigures the virtual server executing the workload taking into account the current workload attributes determined at 906. In some embodiments, if current workload attributes have not changed more than a threshold amount, the virtual server may retain a current configuration and not be reconfigured to include a different quantity or type of server components. Also, in some embodiments, reconfiguring a virtual server may include changing a quantity of server components used to implement the virtual server and/or changing types of server components used to implement the virtual server.

In some embodiments, a dynamic virtual server manager may reconfigure a virtual server in different ways. For example, FIG. 9E illustrates, at 908A, a virtual server being reconfigured between discrete tasks. As another example, FIG. 9F illustrates a virtual server being reconfigured while a workload is being executed, which may take place while a current task is being performed. For example, at 908B a process being executed on one or more processors may be replicated to one or more additional processors as part of a reconfiguration of a virtual server. Also, at 908B, data stored on one or more storage devices assigned to a virtual server may be replicated to one or more other storage devices. In some embodiments, data may be copied from a current storage device to a destination storage device such that the workload can continue to access the data at the current storage device while it is being replicated to the destination storage device.

Figure 10:
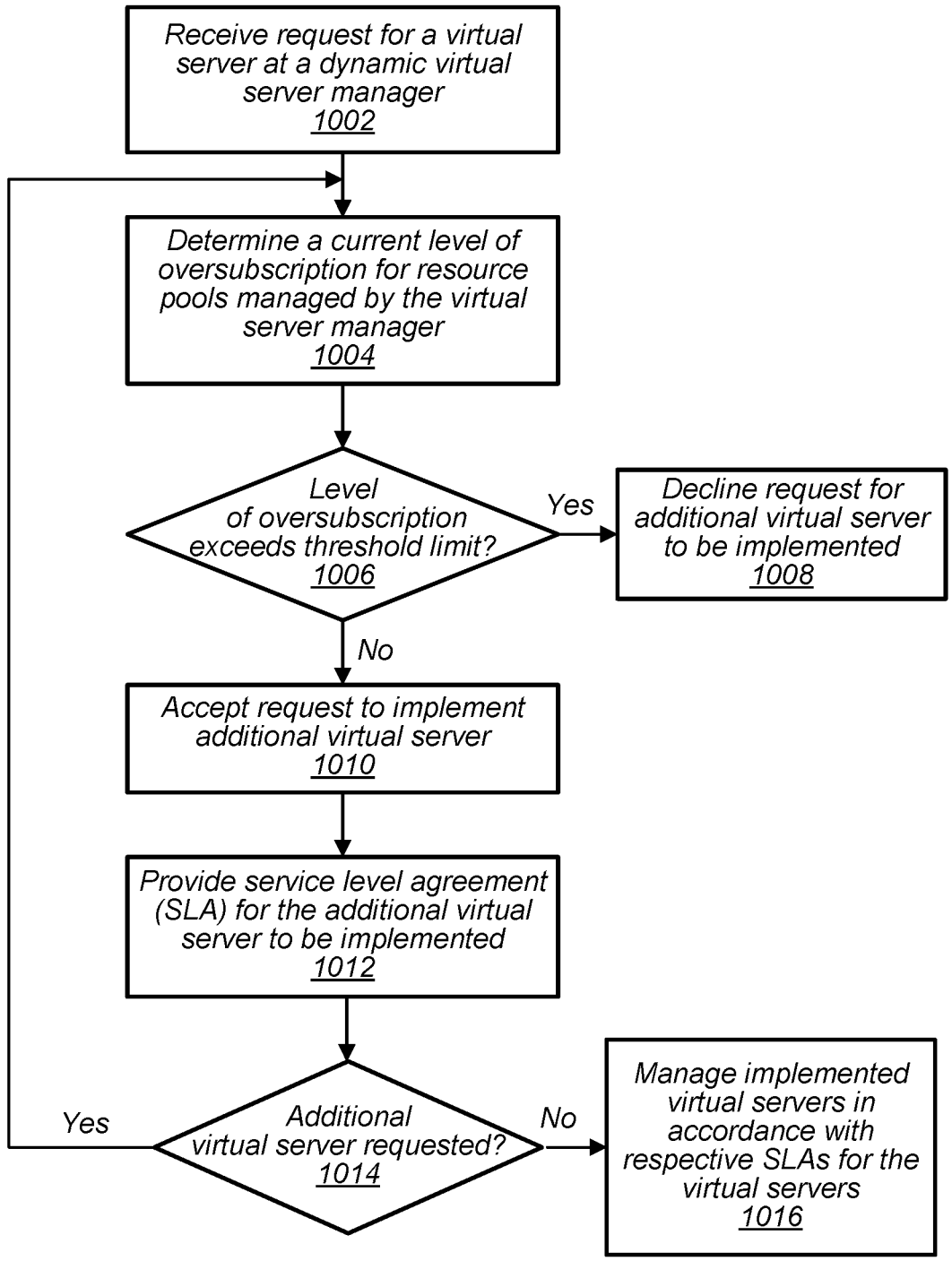
FIG. 10 illustrates a process for processing a request for a virtual server, according to some embodiments.

FIG. 10 illustrates a process for processing a request for a virtual server, according to some embodiments.

At 1002, a dynamic virtual server manager receives a request for a virtual server to be implemented. For example, the dynamic virtual server manager may receive a workload to be executed on the virtual server or the dynamic virtual server manager may receive a request to implement a virtual server prior to receiving a workload to be executed by the virtual server. In some embodiments, a dynamic virtual server manager may receive a request outlining parameters for a virtual server, such as an SLA, for a virtual server that is to be implemented upon receiving a workload to be executed by the virtual server.

At 1004, the dynamic virtual server manager determines a current level of oversubsription for resource pools managed by the virtual server manager. In some cases none of the resource pools may be oversubscribed and in other cases one or more resource pools may be oversubscribed. In some embodiments, a resource pool may be oversubscribed if a total maximum resource commitments via SLAs for resources of the pool exceeds a physical capacity of the resource pool. However, because virtual server demand fluctuates it is unlikely that all virtual servers will be required to perform at maximum SLA commitment levels at the same time, thus a virtual server system may function without issue with some level of oversubscription. However, in order to prevent a failure to meet SLA commitment requirements a level of oversubscription for resource pools may be limited to no more than a threshold amount of oversubscription. In some embodiments, oversubscription may be maintained within an acceptable range. For example, in order to efficiently operate a virtual server system at least some oversubscription may be desired. However, a level of oversubscription may be restrained to not exceed an upper bound of an acceptable predetermined range.

For example, at 1006, it is determined if a current level of oversubscription exceeds a threshold limit for one or more resource pools or deviates from an acceptable predetermined range. If the threshold level of oversubscription is exceeded, at 1008 the dynamic virtual server manager declines the request to implement an additional virtual server.

If a current level of oversubscription is less than the threshold amount, at 1010, the dynamic virtual server manager accepts the request to implement an additional virtual server. At 1012, the dynamic virtual server manager or another system interface component provides a service level agreement to the requestor outlining service commitments for the additional virtual server that is to be implemented.

At 1014, it is determined if another virtual server is to be implemented by the virtual server system, if so, the process reverts to 1004. If not, at 1016 the dynamic virtual server manager manages the implemented virtual servers in accordance with respective SLAs for the implemented virtual servers. In some embodiments, this may include dynamically reconfiguring the virtual servers based on changing workload attributes to ensure that one or more SLA commitments are met.

Figure 11:
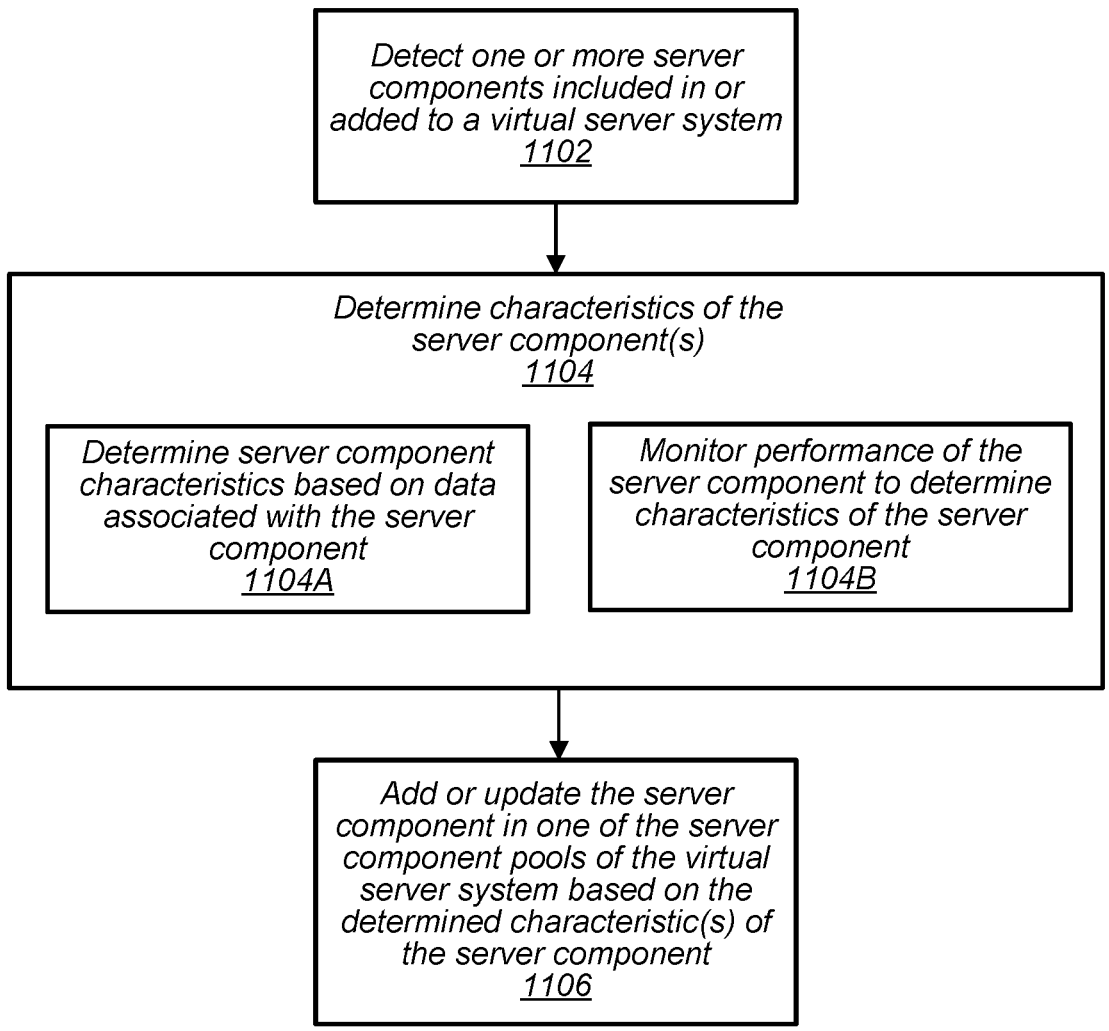
FIG. 11 illustrates a process for identifying and characterizing a server component, according to some embodiments.

FIG. 11 illustrates a process for identifying and characterizing a server component, according to some embodiments.

At 1102, a dynamic virtual server manager detects one or more server components included in or added to a virtual server system. For example, a server component analyzer of a dynamic virtual server manager, such as server component analyzer 558, may initially detect all or a portion of all of the server components included in a virtual server system. Additionally, as server components are added to a virtual server system or replaced in a virtual server system, a server component analyzer may detect the added or replaced server components.

At 1104, the server component analyzer determines characteristics of the detected server components. In some embodiments, at 1104A, a server component analyzer may determine the characteristics of a detected server component based on information that can be read from the server component or ascertained about the server component based on communicating with the server component. For example, a server component analyzer may be able to determine a processor capacity, number of cores, etc. based on connecting to the processor server component. In a similar manner, a storage device server component may include identifying information that can be read from the storage device that indicates characteristics of the storage device. Additionally, or alternatively, at 1104B, a server component analyzer may determine characteristics of a detected server component based on monitoring performance of the server component or historical performance of the server component.

At 1106, the server component analyzer adds the detected server component to the appropriate server component pool that includes server components with similar characteristics. In some embodiments, the server component analyzer may further update one or more tables indicating capacities and/or characteristics of server components of the virtual server system. In some embodiments, for existing server components, the server component analyzer may adjust one or more characteristics stored for the existing server component based on the determined characteristics. In some embodiments, a server component may be moved to a different sub-set of a server component pool based on the determined characteristics. For example, if a processor is included in a sub-pool of turbo-boost processors, but is determined to not have turbo-boost capabilities, the processor may be logically assigned to a different sub-pool of processors other than the turbo-boost processor sub-pool.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g.

SDRAM, DDR, RDRAM, SRAM, etc.), ROM, etc., as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
a rack comprising a pool of physical processors;
another rack comprising a pool of physical storage devices;
a communication fabric connecting the processors in the rack and the storage devices in the other rack; and
a dynamic virtual server manager, configured to:
receive data describing a workload comprising a set of discrete tasks;
determine respective attributes of the workload in two workload dimensions;
select a configuration for a virtual server to execute the workload, wherein the configuration comprises a processor selected from the pool of processors and a storage device selected from the pool of storage devices;
connect, via the communication fabric, the processor and the storage device to implement the virtual server;
dynamically adjust a quantity or type of processors or a quantity or type of storage devices selected to implement the virtual server based on a change in the workload prior to completion of the set of discrete tasks of the workload; and
connect, via the communication fabric, the adjusted quantity or type of processors or the adjusted quantity or type of storage devices selected to implement the virtual server prior to completion of the set of discrete tasks of the workload.

2. The data center of claim 1, wherein the pool of processors comprises:
two different types of processors, each type having a different processing capability than the other type of processor.

3. The data center of claim 2, wherein the types of processors have different numbers of cores.

4. The data center of claim 3, wherein one of the types of processors is a turbo-boost type of processor.

5. The data center of claim 1, wherein the pool of storage devices comprises:
a first type of storage devices comprising solid-state storage devices;
a second type of storage devices comprising hard drive storage devices; and
a third type of storage devices comprising tape storage devices.

6. A virtual server system, comprising:
a pool of processors;
a pool of storage devices;
a communication fabric coupled to the pool of processors and the pool of storage devices; and
a dynamic virtual server manager, configured to:
receive a workload comprising a set of discrete tasks or data describing the workload;
determine respective attributes of the workload in two workload dimensions;
select a configuration for a virtual server to execute the workload, wherein the configuration comprises a processor selected from the pool of processors and a storage device selected from the pool of storage devices;
connect, via the communication fabric, the processor and the storage device to implement the virtual server;
dynamically adjust a quantity or type of processor or a quantity or type of storage device selected to implement the virtual server based on a change in the workload prior to completion of the set of discrete tasks of the workload; and
connect, via the communication fabric, the adjusted quantity or type of processors or the adjusted quantity or type of storage devices selected to implement the virtual server prior to completion of the set of discrete tasks of the workload.

7. The virtual server system of claim 6, wherein the pool of storage devices comprises:
a first type of storage devices comprising solid-state storage devices;
another type of storage devices comprising hard drive storage devices; and
an additional type of storage devices comprising tape storage devices.

8. The virtual server system of claim 6, wherein the pool of processors comprises:
two different types of processors, each type having a different processing capability than the other type.

9. The virtual server system of claim 8, wherein one of the types of processors is a graphics processing unit (GPU) or a field programmable gate array (FPGA).

10. The virtual server system of claim 6, further comprising a pool of network interface cards, wherein the dynamic virtual server manager is further configured to:
select a network interface card from the pool of network interface cards for use in implementing the virtual server;
configure the virtual server to use the selected network interface card; and
dynamically adjust a quantity or type of network interface cards used to implement the virtual server based on a change in the workload prior to completion of the set of discrete tasks of the workload.

11. The virtual server system of claim 6, wherein the pool of processors and the pool of storage devices are configured to communicate with one another via the communication fabric according to a Non-Volatile Memory Express over fabric (NVME over fabric) protocol.

12. The virtual server system of claim 6, wherein the pool of storage devices comprises:
an interface device connected to the communication fabric and configured to at least partially control storage operations for one of the storage devices of the pool of storage devices.

13. The virtual server system of claim 6, wherein the pool of processors and the pool of storage devices are mounted in a common rack.

14. The virtual server system of claim 6, wherein the pool of processors are mounted in a processor rack and the pool of storage devices are mounted in a storage device rack, wherein the virtual server is implemented using resources mounted in more than one rack.

15. The virtual server system of claim 6, wherein the dynamic virtual server manager is further configured to:

provide respective service level agreements (SLAs) to clients of the virtual server system for performing workloads on behalf of the clients; and manage the respective service level agreements such that a level of over-subscription for processing capabilities and storage capabilities of the virtual server system is maintained within a predetermined range.

16. The virtual server system of claim 6, wherein the dynamic virtual server manager is further configured to:

detect a server component included in the pool of processors, the pool of storage devices, or another server component pool; and determine one or more characteristics of the detected server component, wherein selection of the detected server component for use in implementing the virtual server is based on the one or more characteristics.

17. A method, comprising:

receiving a workload comprising a set of discrete tasks or data describing the workload at a dynamic virtual server manager;

determining two attributes of the workload in two workload dimensions;

selecting, from a pool of processors, a processor to execute the workload, wherein the processor is selected based on the two determined workload dimensions for the workload;

selecting, from a pool of storage devices, a storage device for executing the workload, wherein the storage device is selected based on the two determined workload dimensions for the workload;

connecting, via a communication fabric, the selected processor and the selected storage device to implement a virtual server to execute the workload;

dynamically adjusting, based on a change in the workload prior to completion of the set of discrete tasks of the workload:

a quantity or type of processors selected for the virtual server; or a quantity or type of storage devices selected for the virtual server; and connecting, via the communication fabric, the adjusted quantity or type of processors or the adjusted quantity or type of storage devices selected to implement the virtual server prior to completion of the set of discrete tasks of the workload.

18. The method of claim 17, wherein the two determined workload dimensions comprise:

a processing requirement for the workload;

a storage I/O frequency requirement for the workload;

a quantity of random access memory required for the workload; or an amount of data storage required for the workload.

19. The method of claim 17, further comprising:

selecting, from a pool of memory devices, a memory device for executing the workload, wherein the memory device is selected based on the two determined workload dimensions for the workload; and dynamically adjusting a quantity of memory devices or types of memory devices used to implement the virtual server, based on a change in the workload prior to completion of the set of discrete tasks of the workload.

20. The method of claim 17, wherein the set of discrete tasks of the workload comprises a plurality of discrete tasks, wherein said dynamically adjusting is performed after the completion of one of the discrete tasks of the workload, wherein said dynamically adjusting comprises:

selecting a different quantity or a different type of processors to implement the virtual server between performance of individual discrete tasks of the set of discrete tasks of the workload; or selecting a different quantity or a different type of storage devices to implement the virtual server between performance of individual discrete tasks of the set of discrete tasks of the workload.

21. The method of claim 17, wherein said dynamically adjusting comprises:

replicating a process being executed on the selected processor to an additional processor prior to completion of the set of discrete tasks of the workload; or replicating data stored on the selected storage device to an additional storage device prior to completion of the set of discrete tasks of the workload.

\* \* \* \* \*